(12) United States Patent
Kim et al.

(10) Patent No.: US 12,141,364 B2
(45) Date of Patent: Nov. 12, 2024

(54) WEARABLE DEVICE FOR COMMUNICATING WITH AT LEAST ONE COUNTERPART DEVICE ACCORDING TO TRIGGER EVENT AND CONTROL METHOD THEREFOR

(71) Applicant: Samsung Electronics Co., Ltd., Suwon-si (KR)

(72) Inventors: Yeojin Kim, Suwon-si (KR); Miji Park, Suwon-si (KR); Eunyoung Park, Suwon-si (KR); Sanga Yoo, Suwon-si (KR); Yeongwoong Yoo, Suwon-si (KR); Minhwa Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/987,365

(22) Filed: Nov. 15, 2022

(65) Prior Publication Data

US 2023/0152899 A1     May 18, 2023

Related U.S. Application Data

(63) Continuation of application No. PCT/KR2022/017746, filed on Nov. 11, 2022.

(30) Foreign Application Priority Data

Nov. 15, 2021 (KR) .......................... 10-2021-0156598
Dec. 9, 2021 (KR) .......................... 10-2021-0175632

(51) Int. Cl.
    *G06F 3/01*          (2006.01)
    *G06V 40/16*       (2022.01)
    *H04M 1/72436*   (2021.01)

(52) U.S. Cl.
    CPC .............. *G06F 3/017* (2013.01); *G06F 3/011* (2013.01); *G06V 40/176* (2022.01); *H04M 1/72436* (2021.01)

(58) Field of Classification Search
    CPC ...................................................... G06F 3/011
    See application file for complete search history.

(56) References Cited

U.S. PATENT DOCUMENTS 9,389,420 B2    7/2016   Maciocci et al.
2013/0262578 A1   10/2013   Kim
(Continued)

FOREIGN PATENT DOCUMENTS

JP       2010-146481 A    7/2010
JP       6256339 B2       1/2018
(Continued)

OTHER PUBLICATIONS

International Search Report dated Feb. 23, 2023, issued in an International Patent Application No. PCT/KR2022/017746.

*Primary Examiner* — Nan-Ying Yang
(74) *Attorney, Agent, or Firm* — Jefferson IP Law, LLP

(57) ABSTRACT

A wearable device for communicating with at least one counterpart device according to a trigger event and a control method are provided. The wearable device includes a display module and at least one processor, wherein the at least one processor is configured to control the display module such that at least one graphical object is displayed in a display area, identify whether a user's body part is positioned in a first area, identify a group corresponding to the first area, based on a fact that the user's body part is positioned in the first area, identify whether a trigger event by the user is detected while the user's body part is positioned in the first area, and perform, based on the detection of the trigger event, a function corresponding to the trigger (Continued)

event with respect to at least one counterpart device included in the identified group.

20 Claims, 32 Drawing Sheets

(56) References Cited

U.S. PATENT DOCUMENTS

| | | |
|---|---|---|
| 2015/0227222 A1 | 8/2015 | Sako et al. |
| 2015/0277559 A1 | 10/2015 | Vescovi et al. |
| 2015/0317518 A1* | 11/2015 | Fujimaki .............. G02B 27/017 345/633 |
| 2016/0034039 A1* | 2/2016 | Maeda ................ G06F 3/04842 715/810 |
| 2016/0378294 A1 | 12/2016 | Wright et al. |
| 2018/0143686 A1 | 5/2018 | An et al. |
| 2020/0201444 A1* | 6/2020 | Stoyles ................ G06F 3/1423 |
| 2021/0191526 A1 | 6/2021 | Heo et al. |
| 2022/0083131 A1 | 3/2022 | Lee et al. |
| 2022/0253182 A1 | 8/2022 | Schwarz et al. |

FOREIGN PATENT DOCUMENTS

| | | |
|---|---|---|
| KR | 10-2013-0111868 A | 10/2013 |
| KR | 10-1712350 B1 | 3/2017 |
| KR | 10-2018-0041000 A | 4/2018 |
| KR | 10-2018-0064748 A | 6/2018 |
| KR | 10-1933289 B1 | 12/2018 |
| KR | 10-2020-0120467 A | 10/2020 |
| KR | 10-2021-0116383 A | 9/2021 |
| WO | 2020-130688 A1 | 6/2020 |

* cited by examiner

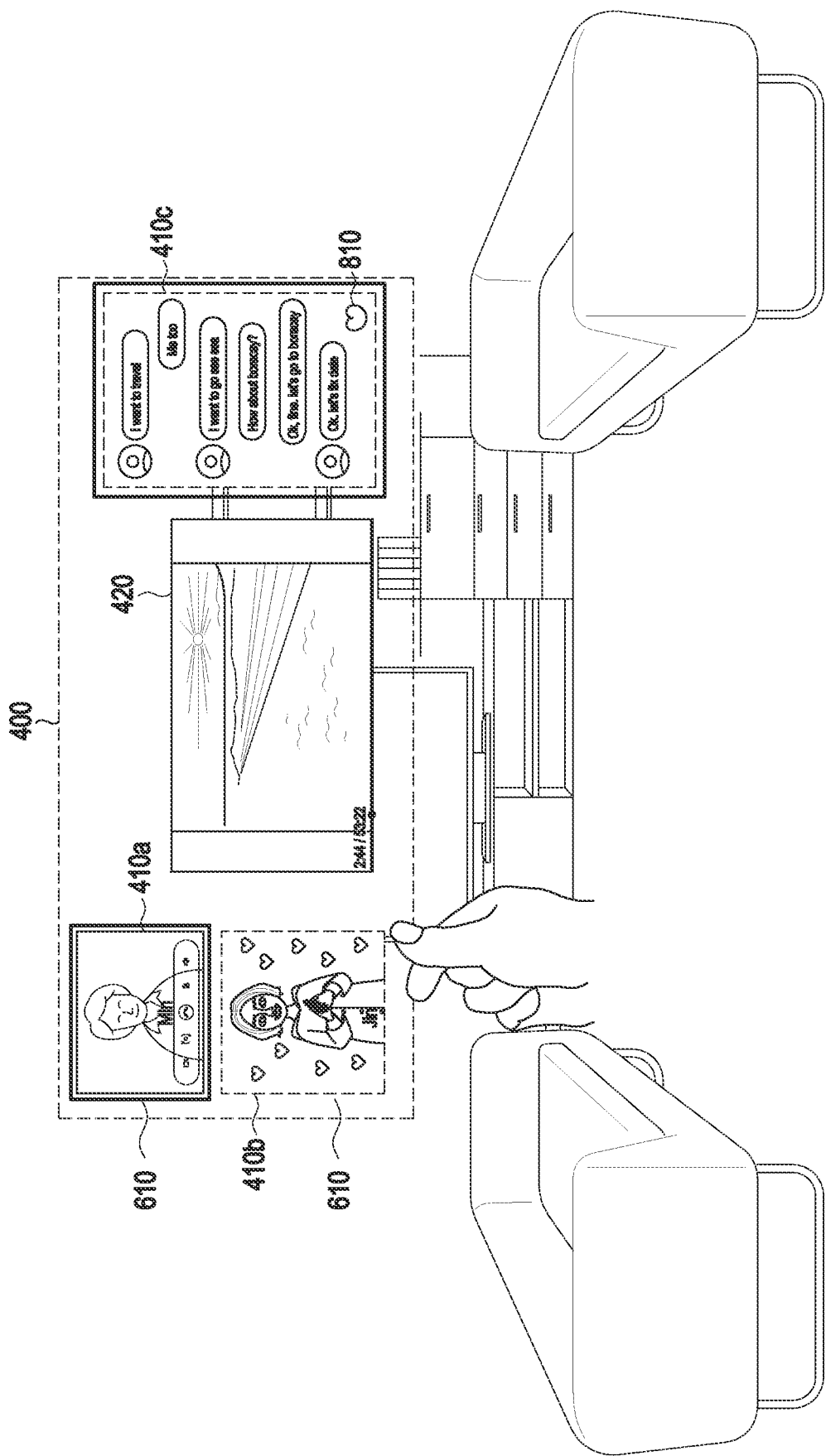

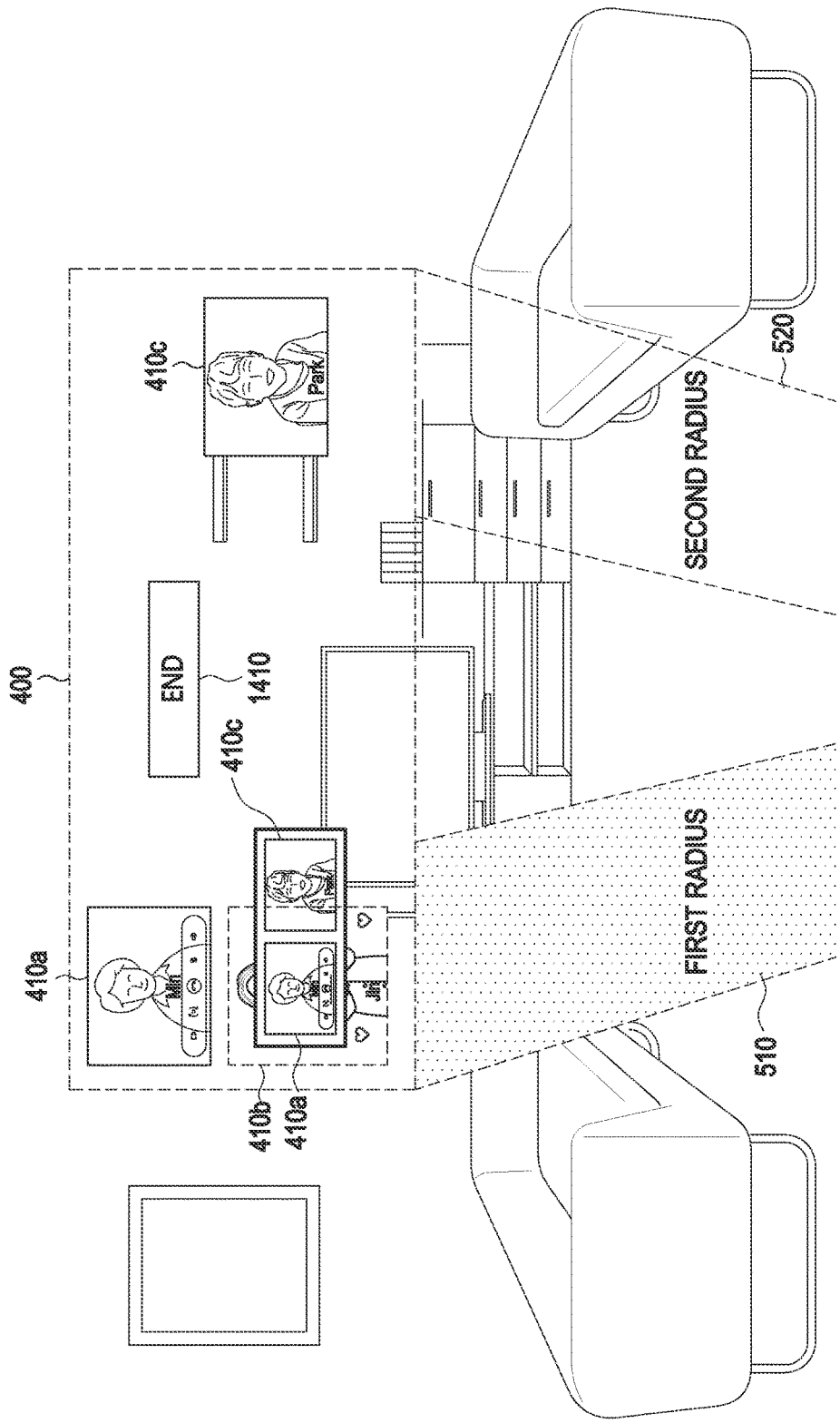

WEARABLE DEVICE FOR COMMUNICATING WITH AT LEAST ONE COUNTERPART DEVICE ACCORDING TO TRIGGER EVENT AND CONTROL METHOD THEREFOR

CROSS-REFERENCE TO RELATED APPLICATION(S)

This application is a continuation application, claiming priority under § 365(c), of an International application No. PCT/KR2022/017746, filed on Nov. 11, 2022, which is based on and claims the benefit of a Korean patent application number 10-2021-0156598, filed on Nov. 15, 2021, in the Korean Intellectual Property Office, and of a Korean application number 10-2021-0175632, filed on Dec. 9, 2021, in the Korean Intellectual Property, the disclosure of each of which is incorporated by reference herein in its entirety.

TECHNICAL FIELD

The disclosure relates to a wearable device for communicating with at least one counterpart device according to a trigger event and a control method therefor. More particularly, the disclosure relates to a wearable device capable of providing information about a virtual object provided through the wearable device and/or a function according to a trigger event by a first user to even a user performing a specific task with the first user without the wearable device.

BACKGROUND ART

Various services and additional functions provided through an electronic device, for example, a portable electronic device, such as a smartphone, are gradually increasing. In order to increase the utility value of such an electronic device and satisfy the needs of various users, communication service providers or electronic device manufacturers are competitively developing electronic devices to provide various functions and differentiate them from other companies. Accordingly, various functions provided through the electronic device are also increasingly advanced.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Recently, a glasses-type wearable device has been used for various purposes. For example, the cases of conducting meetings or lectures using glasses-type wearable devices are rapidly increasing. However, in the case of performing a specific task (e.g., conducting a meeting) using the glasses-type wearable device, existing glasses-type wearable devices only provided a function of providing only a virtual object related to a specific task (e.g., a screen of a counterpart attending a meeting), and did not provide any function or operation of performing a specific function (e.g., transmitting an emotional expression related to a "heart gesture" to a counterpart device) according to a trigger event (e.g., detection of the "heart gesture") by a user's body part (e.g., a hand). Furthermore, in the case of a user (a second user) performing a specific task with a first user (e.g., a user performing the specific task through a wearable device) without a glasses-type wearable device, the existing glasses-type wearable device did not provide any function or operation of providing the second user with information related to a virtual object provided through the glasses-type wearable device.

Aspects of the disclosure are to address at least the above-mentioned problems and/or disadvantages and to provide at least the advantages described below. Accordingly, an aspect of the disclosure is to provide a wearable device capable of improving the usability of the wearable device by performing a specific function (transmission of an emotional expression related to a "heart gesture" to a counterpart device) according to a trigger event (detection of the "heart gesture") by a user's body part (e.g., a hand).

Another aspect of the disclosure is to provide a wearable device capable of providing information about a virtual object provided through the wearable device and/or a function according to a trigger event by a first user to even a user performing a specific task with the first user without the wearable device.

Additional aspects will be set forth in part in the description which follows and, in part, will be apparent from the description, or may be learned by practice of the presented embodiments.

Technical Solution

In accordance with an aspect of the disclosure, a wearable device is provided. The wearable device includes a display module and at least one processor, wherein the at least one processor is configured to control the display module such that at least one graphical object is displayed in a display area (or, region), identify whether a user's body part is positioned in a first area, identify a group corresponding to the first area, based on a fact that the user's body part is positioned in the first area, identify whether a trigger event by the user is detected while the user's body part is positioned in the first area, and perform, based on the detection of the trigger event, a function corresponding to the trigger event with respect to at least one counterpart device included in the identified group, and the function is a function commonly performed with respect to the at least one counterpart device.

In accordance with another aspect of the disclosure, a method for controlling a wearable device is provided. The method includes controlling a display module of the wearable device such that at least one graphical object is displayed in a display area, identifying whether a user's body part is positioned in a first area, identifying a group corresponding to the first area, based on a fact that the user's body part is positioned in the first area, identifying whether a trigger event by the user is detected while the user's body part is positioned in the first area, and performing, based on the detection of the trigger event, a function corresponding to the trigger event with respect to at least one counterpart device included in the identified group, wherein the function is a function commonly performed with respect to the at least one counterpart device.

Advantageous Effects

An embodiment of the disclosure is to provide a wearable device capable of improving the usability of the wearable device by performing a specific function (transmission of an emotional expression related to a "heart gesture" to a counterpart device) according to a trigger event (detection of the "heart gesture") by a user's body part (e.g., a hand).

An embodiment of the disclosure is to provide a wearable device capable of providing information about a virtual object provided through the wearable device and/or a function according to a trigger event by a first user to even a user performing a specific task with the first user without the wearable device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 8 is an illustration for describing a function or operation in which a specific function is performed by a glasses-type wearable device based on a trigger event (e.g., detection of a trigger gesture) according to an embodiment of the disclosure;

FIGS. 14A, 14B, 14C, and 14D are illustrations for describing a function and operation described in FIG. 13 in terms of a graphical user interface according to various embodiments of the disclosure.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
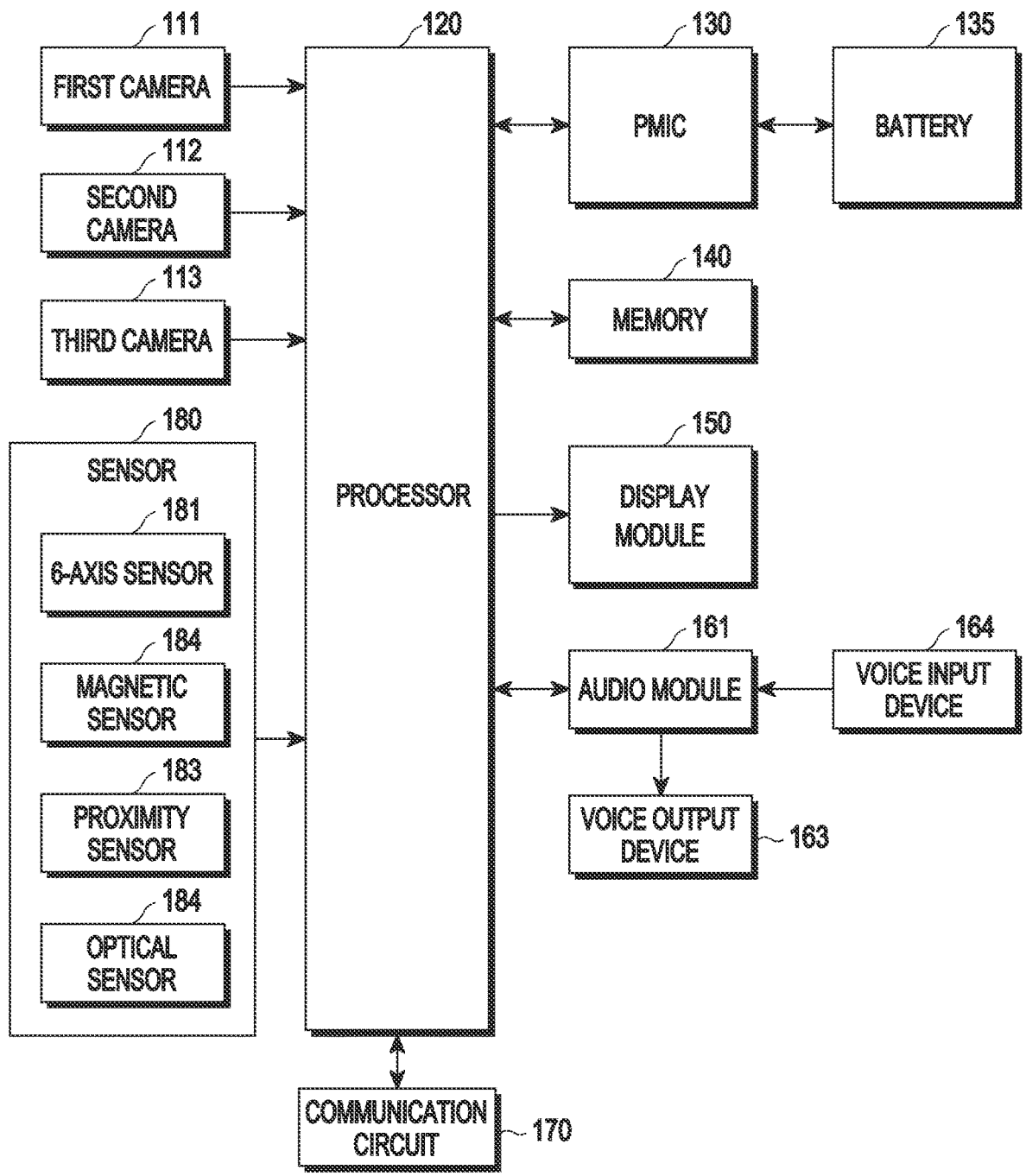
FIG. 1 is an illustration for describing a glasses-type wearable device according to an embodiment of the disclosure.

FIG. 1 is an illustration for describing a glasses-type wearable device according to an embodiment of the disclosure.

Referring to FIG. 1, a glasses-type wearable device 100 will be described as an example, but the disclosure is not limited thereto. For example, various embodiments described herein may be applied to at least one among an accessory type (e.g., a watch, a ring, a bracelet, an anklet, a necklace, glasses, contact lenses, or a head-mounted device (HMD) or a head-mounted display (HMD)), a textile or clothing-integrated type (e.g., electronic clothing), a body-mounted type (e.g., a skin pad or tattoo), or a bio-implantable circuit.

The glasses-type wearable device 100 according to an embodiment of the disclosure may include at least one among a first camera 111, second camera 112, a third camera 113, at least one processor 120, a power management integrated circuit (PMIC) 130, a battery 135, a memory 140, a display module 150, an audio module 161, a voice input device 162, a voice output device 163, a communication circuit 170, and a sensor 180.

According to an embodiment of the disclosure, an image acquired through the first camera 111 may be used to detect a hand gesture by a user, tracking the user's head, and/or recognize a space. According to an embodiment of the disclosure, the first camera 111 may include a global shutter (GS) camera. According to an embodiment of the disclosure, the first camera 111 may perform a simultaneous localization and mapping (SLAM) operation through depth imaging. According to an embodiment of the disclosure, the first camera 111 may perform space recognition for 6 degree of freedom (DoF). The first camera 111 according to an embodiment of the disclosure may be configured to image a real world corresponding to a first user's gaze when being worn on the first user. The glasses-type wearable device 100 according to an embodiment of the disclosure may identify, through for example a proximity sensor included in the glasses-type wearable device 100, whether the user is wearing the glasses-type wearable device 100. Alternatively, the glasses-type wearable device 100 according to an embodiment of the disclosure may identify, through an angle sensor provided at a hinge part of the glasses-type wearable device 100, whether a frame of the glasses-type wearable device 100 is unfolded (e.g., an unfolded state), and when the approach of the user is detected while the frame of the glasses-type wearable device 100 is unfolded, may determine that the glasses-type wearable device 100 is worn by the user.

According to an embodiment of the disclosure, an image acquired through the second camera 112 may be used to detect and track the user's pupil. According to an embodiment of the disclosure, the second camera 112 may include a GS camera. The second camera 112 may correspond to a left eye and a right eye, respectively, and the second camera 112 may have identical or similar performance. The second camera 112 may be configured to acquire an image of a facial expression of the user. At least one processor 120 may be configured to detect a change in the facial expression of the user, based on the image of the facial expression of the user acquired by the second camera 112.

According to an embodiment of the disclosure, the third camera 113 may include may include a camera having a higher resolution than the first camera 111 and the second camera 112. According to an embodiment of the disclosure, the third camera 113 may perform an auto-focusing (AF) function and a stabilization function. According to an embodiment of the disclosure, the third camera 113 may include a GS camera, or may include a rolling shutter (RS) camera. The first camera 111 according to an embodiment of the disclosure may be configured to image a real world corresponding to the first user's gaze when being worn on the first user.

The at least one processor 120 may control the elements of the glasses-type wearable device 100, for example, the first camera 111, the second camera 112, the third camera 113, the PMIC 130, the memory 140, the display module 150, the audio module 161, the communication circuit 170, and the sensor 180, and may perform various types of data processing or operations. The at least one processor 120 according to an embodiment of the disclosure may execute, for example, software (e.g., programs) to control at least one other element (e.g., a hardware or software element) of the glasses-type wearable device 100 connected to the at least one processor 120, and may perform various types of data processing or operations. According to an embodiment of the disclosure, as at least a part of the data processing or operations, the at least one processor 120 may store a command or data received from another element (e.g., a sensor module 176 or a communication module 190) in a volatile memory, may process the command or data stored in the volatile memory, and may store result data in the nonvolatile memory. According to an embodiment of the disclosure, the at least one processor 120 may include a main processor (e.g., a central processing unit or an application processor) or an auxiliary processor (e.g., a graphics processing unit or a neural processing unit (NPU), an image signal processor, a sensor hub processor, or a communication processor) operable independently of or together with the main processor. For example, when the glasses-type wearable device 100 includes the main processor and the auxiliary processor, the auxiliary processor may be configured to use lower power than the main processor or to be specialized in a designated function. The auxiliary processor may be implemented separately from or as a part of the main processor.

The PMIC 130 according to an embodiment of the disclosure may convert power stored in the battery 135 so as to have a current or a voltage required by the other elements of the glasses-type wearable device 100, and may supply the power to the other elements of the glasses-type wearable device 100.

The memory 140 according to an embodiment of the disclosure may store various data used by at least one element (e.g., the at least one processor 120 or the sensor 180) of the glasses-type wearable device 100. The memory 140 according to an embodiment of the disclosure may include volatile memory or nonvolatile memory.

The display module 150 according to an embodiment of the disclosure may display a screen to be provided to the user. The display module 150 according to an embodiment of the disclosure may output data (e.g., red green blue (RGB) data) for expression a virtual object (e.g., an augmented reality guide). The display module 150 according to an embodiment of the disclosure may include a first display 251, a second display 252, one or more input optical members 253-1 and 253-2, one or more transparent members 290-1 and 290-2, and one or more screen display parts 254-1 and 254-2.

The audio module 161 according to an embodiment of the disclosure may be connected to the voice input device 162 and the voice output device 163 to convert data that is input through the voice input device 162, and may convert data to be output to the voice output device 163. The voice input device 162 according to an embodiment of the disclosure may include at least one microphone, and the voice output device 163 may include at least one speaker and amplifier. The communication circuit 170 according to an embodiment of the disclosure may establish a wireless communication channel with an external electronic device connected to the glasses-type wearable device 100 and may support performing communication through the established communication channel. The sensor 180 according to an embodiment of the disclosure may include a 6-axis sensor 181, a magnetic sensor 182, a proximity sensor 183, and/or an optical sensor 184.

The glass-type wearable device 100 according to an embodiment herein may identify, through for example a proximity sensor included in the glass-type wearable device 100, whether the user is wearing the glass-type wearable device 100. Alternatively, the glass-type wearable device 100 according to an embodiment of the disclosure may identify, through an angle sensor provided at a hinge part of the glass-type wearable device 100, whether a frame of the glass-type wearable device 100 is unfolded (e.g., an unfolded state), and when the approach of the user is sensed while the frame of the glass-type wearable device 100 is unfolded, may determine that the glass-type wearable device 100 is worn by the user.

Figure 2A:
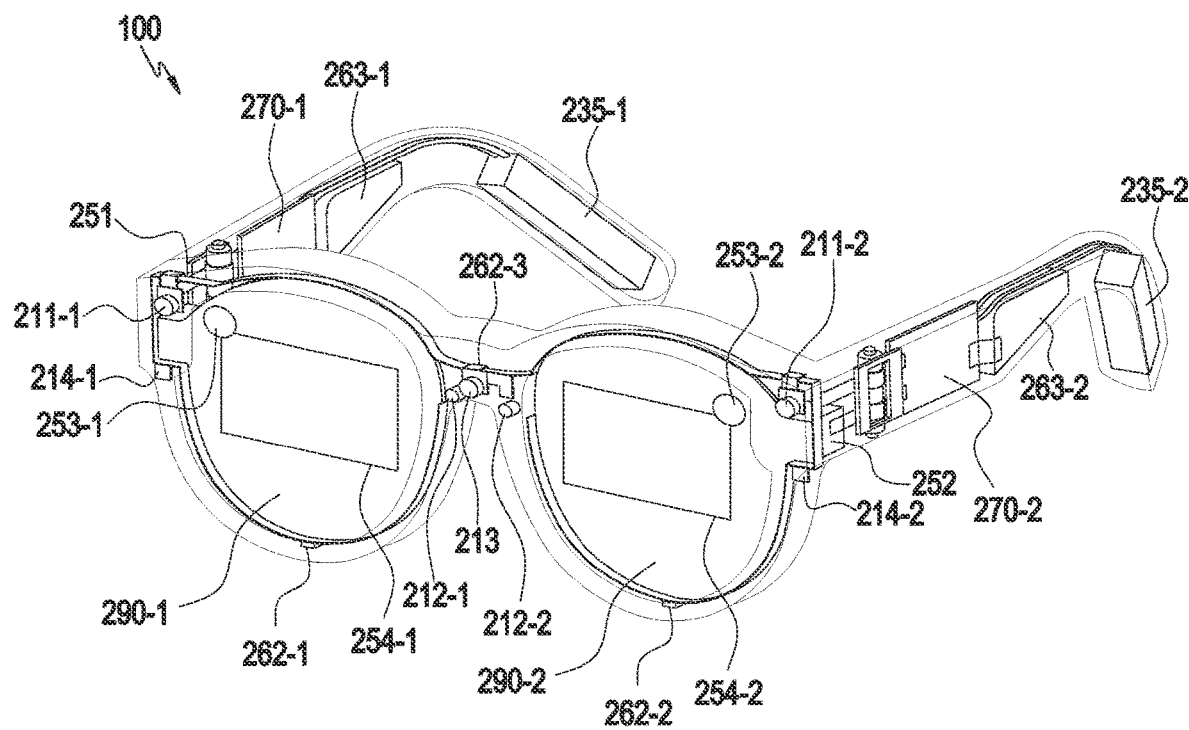
FIG. 2A is an illustration for describing a structure of a glasses-type wearable device according to an embodiment of the disclosure.

FIG. 2A is an illustration for describing a structure of a glasses-type wearable device according to an embodiment of the disclosure.

Referring to FIG. 2A, the glasses-type wearable device 100 may include one or more light-emitting elements 214-1 and 214-2. The light-emitting elements 214-1 and 214-2 according to an embodiment of the disclosure may be different from a light source which is described later and emits light to a screen output area of a display. According to an embodiment of the disclosure, in detecting and tracking the pupil of a user through one or more second cameras 212-1 and 212-2, the light-emitting elements 214-1 and 214-2 may emit light for making the pupil detection easy. According to an embodiment of the disclosure, each of the light-emitting elements 214-1 and 214-2 may include an LED. According to an embodiment of the disclosure, the light-emitting elements 214-1 and 214-2 may emit light in an infrared area. According to an embodiment of the disclosure, the light-emitting elements 214-1 and 214-2 may be attached to the periphery of a frame of the glasses-type wearable device 100. According to an embodiment of the disclosure, the light-emitting elements 214-1 and 214-2 may be positioned near one or more first cameras 211-1 and 211-2, and when the glasses-type wearable device 100 is used in a dark environment, may assist in gesture detection, head tracking, and space recognition by the one or more cameras 211-1 and 211-2. According to an embodiment of the disclosure, the light-emitting elements 214-1 and 214-2 may be positioned around one or more third cameras 213, and when the glasses-type wearable device 100 is used in a dark environment, may assist in image acquisition by the one or more third cameras 213.

According to an embodiment of the disclosure, the glasses-type wearable device 100 may include batteries 235-1 and 235-2. The batteries 235-1 and 235-2 may store power for operating the other elements of the glasses-type wearable device 100.

According to an embodiment of the disclosure, the glasses-type wearable device 100 may include a first display 251, a second display 252, one or more input optical members 253-1 and 253-2, one or more transparent members 290-1 and 290-2, and one or more display parts 254-1 and 254-2. According to an embodiment of the disclosure, the first display 251 and the second display 252 may include, for example, a liquid crystal display (LCD), a digital mirror device (DMD), a liquid crystal on silicon (LCoS), an organic light-emitting diode (OLED), or a micro light-emitting diode (micro-LED). According to an embodiment of the disclosure, when each of the first display 251 and the second display 252 is formed as one of a liquid crystal display (LCD), a digital mirror device (DMD), or a liquid crystal on silicon (LCoS), the glasses-type wearable device 100 may include a light source for emitting light to a screen output area of a display. According to an embodiment of the disclosure, when the first display 251 and the second display 252 generates by themselves (for example, when each of the first display 251 and the second display 252 is formed as one of an organic light-emitting diode or a micro-LED), the glasses-type wearable device 100 may provide a relatively good quality virtual image to a user even when a separate light source is not included.

According to an embodiment of the disclosure, the one or more transparent members 290-1 and 290-2 may be arranged to face the user's eyes when the user wears the glasses-type wearable device 100. According to an embodiment of the disclosure, the one or more transparent members 290-1 and 290-2 may include at least one among a glass plate, a plastic plate, or polymer. According to an embodiment of the disclosure, when the user wears the glasses-type wearable device 100, the user may see an outside world through the one or more transparent members 290-1 and 290-2. According to an embodiment of the disclosure, the one or more input optical members 253-1 and 253-2 may guide light generated by the first display 251 and the second display 252 to the user's eyes. According to an embodiment of the disclosure, an image based on light generated by the first display 251 and the second display 252 is formed on the one or more display parts 254-1 and 254-2 on the one or more transparent members 290-1 and 290-2, and the user may see the image formed on the one or more display parts 254-1 and 254-2.

According to an embodiment of the disclosure, the glasses-type wearable device 100 may include one or more optical waveguides (not shown). The optical waveguide may transfer light generated by the first display 251 and the second display 252 to the user's eyes. The glasses-type wearable device 100 may include one optical waveguide corresponding to each of the left eye and the right eye. According to an embodiment of the disclosure, the optical waveguide may include at least one of glass, plastic, or polymer. According to an embodiment of the disclosure, the optical waveguide may include a nano pattern formed on one of an inner or outer surface, for example, a grating structure having a polygonal or curved shape. According to an embodiment of the disclosure, the optical waveguide may include a free-form prism. In this case, the optical waveguide may provide incident light to the user through a reflective mirror. According to an embodiment of the disclosure, the optical waveguide may include at least one among at least one diffractive element (e.g., a diffractive optical element (DOE) or a holographic optical element (HOE)) or reflective element (e.g., a reflective mirror), and the at least one diffractive element or reflective element included in the optical waveguide may be used to guide display light emitted from a light source to the user's eyes. According to an embodiment of the disclosure, the diffractive element may include an input/output optical member. According to an embodiment of the disclosure, the reflective element may include a member for causing total reflection.

According to an embodiment of the disclosure, the glasses-type wearable device 100 may include one or more voice input devices 262-1, 262-2, and 262-3 and one or more voice output devices 263-1 and 263-2.

According to an embodiment of the disclosure, the glasses-type wearable device 100 may include a first printed circuit board (PCB) 270-1 and a second PCB 270-2. The first PCB 270-1 and the second PCB 270-2 may be configured to transmit electrical signals to the elements included in the glasses-type wearable device 100, such as the first camera 111, the second camera 112, the third camera 113, the display module 150, the audio module 161, and the sensor 180. According to an embodiment of the disclosure, the first PCB 270-1 and the second PCB 270-2 may include a flexible printed circuit board (FPCB). According to an embodiment of the disclosure, each of the first PCB 270-1 and the second PCB 270-2 may include a first substrate, a second substrate, and an interposer disposed between the first substrate and the second substrate.

Figure 2B:
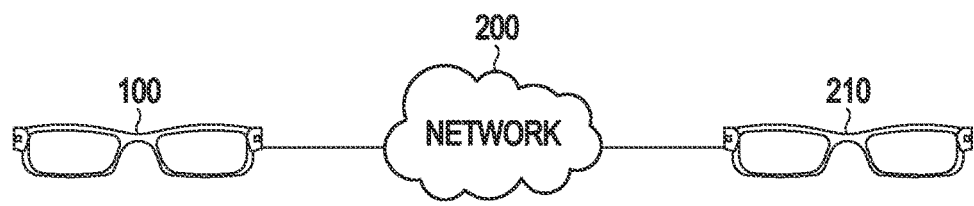
FIGS. 2B and 2C are illustrations for describing a connection relationship of a glasses-type wearable device according to various embodiments of the disclosure.
Figure 2C:
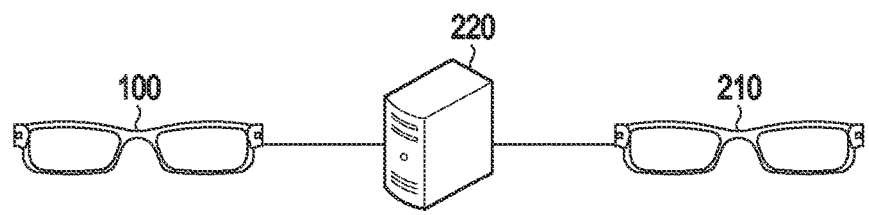

FIGS. 2B and 2C are illustrations for describing a connection relationship of a glasses-type wearable device according to various embodiments of the disclosure.

Referring to FIG. 2B, the glasses-type wearable device 100 of a first user may be directly connected to an external electronic device 210 (e.g., the counterpart device 280) through a network 200. The network 200 may include a first network (e.g., a short-range communication network, such as Bluetooth, wireless fidelity (Wi-Fi) direct, or infrared data association (IrDA)) or a second network (e.g., a long-range communication network, such as a legacy cellular network, a 5$^{th}$ generation (5G) network, a next-generation communication network, Internet, or a computer network (e.g., local area network (LAN) or wide area network (WAN)). Alternatively, referring to FIG. 2C, the glasses-type wearable device 100 of the first user may be connected to the counterpart device 210 through a server 220. The server 220 may include an intelligent server using machine learning and/or a neural network. Although smart glasses are illustrated as an example of the counterpart device 280 in FIGS. 2B and 2C, the embodiment of the counterpart device 280 is not limited thereto. Herein, as an example of an external electronic device, the term "counterpart device 280" is used, but this does not necessarily imply only a device owned by a user different from an owner of the glasses-type wearable device 100. According to various embodiments of the disclosure, the "counterpart device 280" may include various types of devices owned by the owner of the glasses-type wearable device 100.

Figure 3:
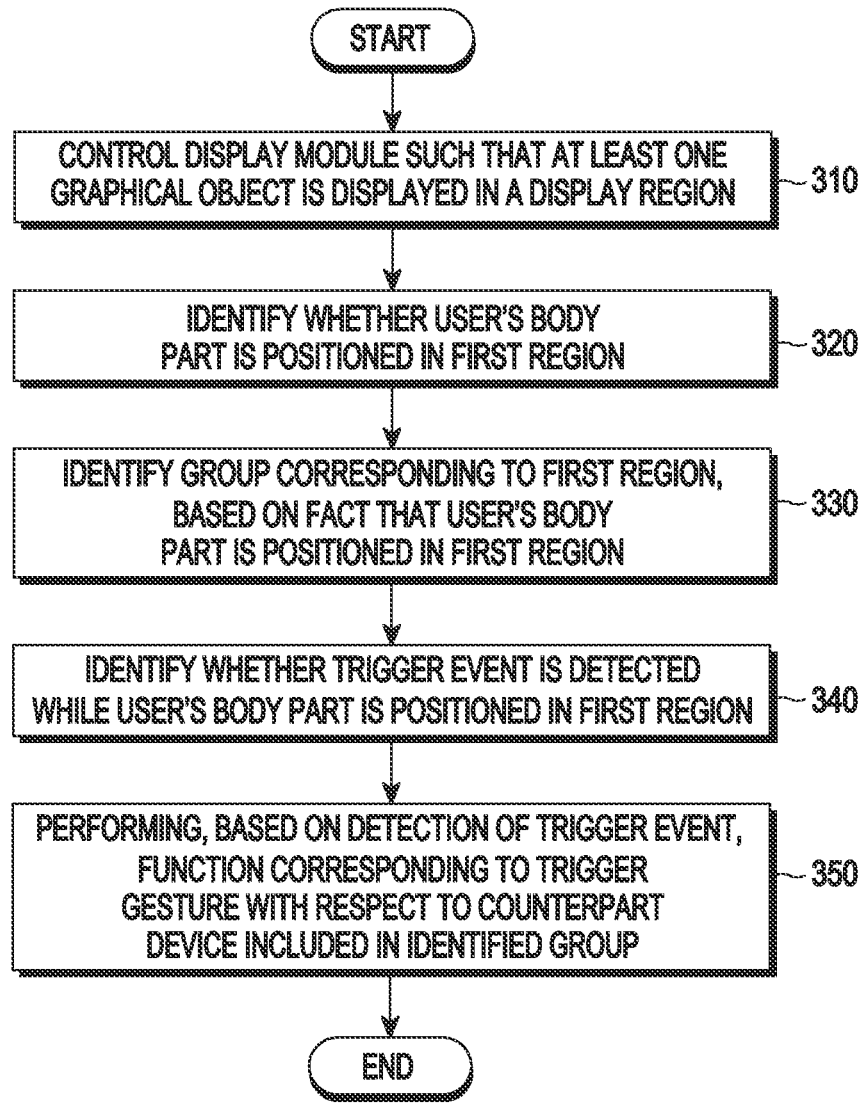
FIG. 3 is an illustration for describing a function or operation of performing a specific function by a glasses-type wearable device based on a trigger event according to an embodiment of the disclosure.

FIG. 3 is an illustration for describing a function or operation of performing a specific function by a glasses-type wearable device based on a trigger event according to an embodiment of the disclosure.

Referring to FIG. 3, in operation 310, the glasses-type wearable device 100 may control the display module 150 such that at least one graphical object (e.g., a first graphical object 410a, a second graphical object 410b, a third graphical object 410c and a fourth graphical object 420) is displayed in a display area 400.

Figure 4:
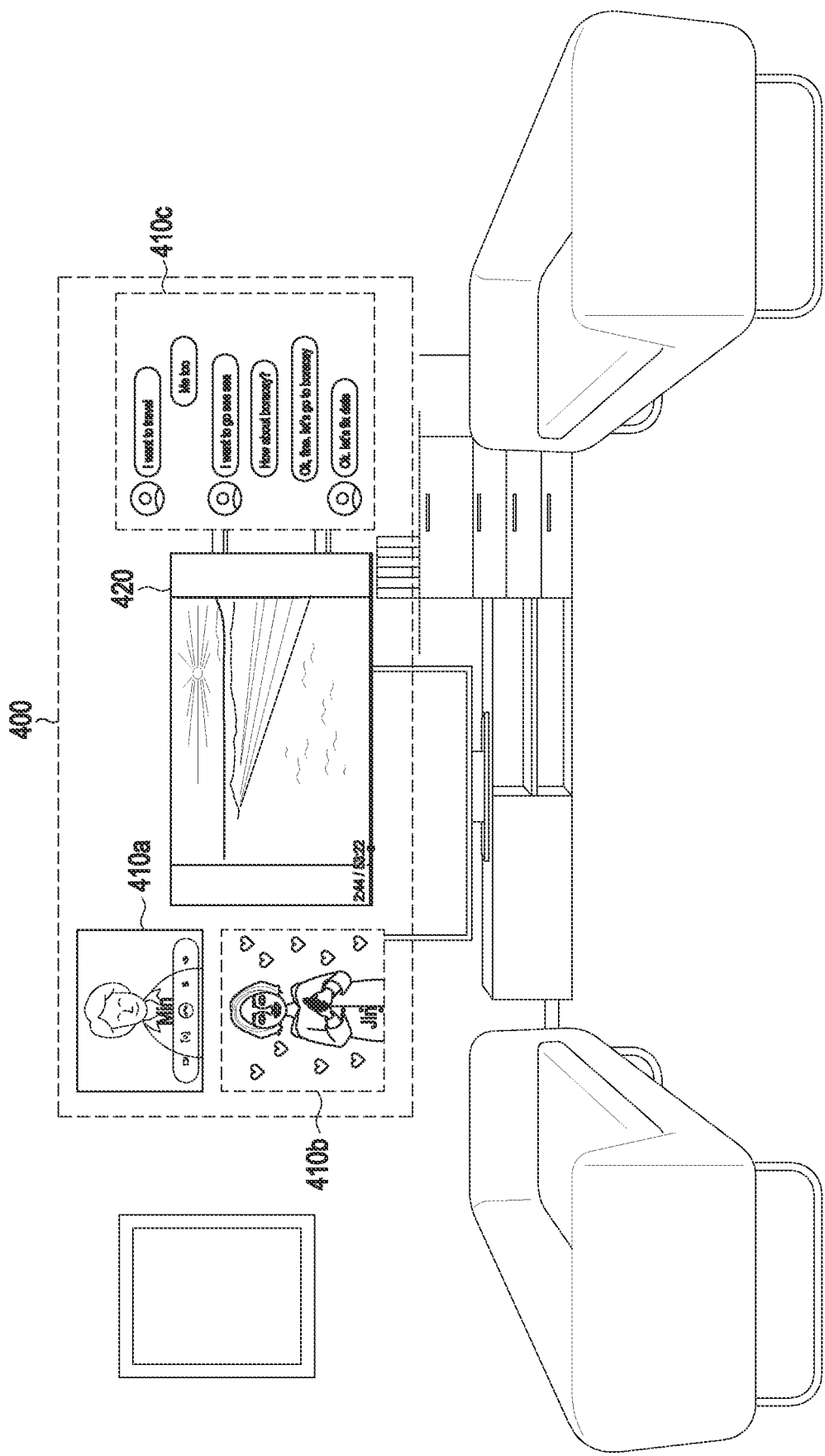
FIG. 4 is an illustration for describing at least one graphical object displayed by a glasses-type wearable device according to an embodiment of the disclosure.

FIG. 4 is an illustration for describing at least one graphical object displayed by a glasses-type wearable device according to an embodiment of the disclosure.

Referring to FIG. 4, the display area 400 according to an embodiment of the disclosure may be an area configured such that at least one graphical object (e.g., the first graphical object 410a, the second graphical object 410b, the third graphical object 410c, and the fourth graphical object 420) is displayed as a virtual object. According to an embodiment of the disclosure, the terms "field of view of the glasses-type wearable device 100" and/or "field of view of a display module" may be used as terms that implies the size of the display area 400 itself (e.g., the transverse and longitudinal lengths of the display area 400, or the transverse and longitudinal angle ranges thereof (e.g., 50 degrees transversely and 30 degrees longitudinally) or the area of the display area 400 itself. In the display area 400 according to an embodiment of the disclosure, at least one graphical object (e.g., the first graphical object 410a, the second graphical object 410b, and the third graphical object 410c) corresponding to at least one counterpart device 280 operably connected to the glasses-type wearable device 100 may be displayed. The glasses-type wearable device 100 may be configured to receive information about the counterpart device 280 through a first network, a second network, and/or a server. The at least one graphical object (e.g., the first graphical object 410a, the second graphical object 410b, and the third graphical object 410c) may include, for example, a three-dimensional avatar (e.g., augmented reality (AR) Emoji) configured by a first user (e.g., a user using the glasses-type wearable device 100) or a second user (e.g., a user of the counterpart device 280), a video call execution screen, a voice call execution screen preconfigured by a call application, and/or a screen including a text message according to a format provided a message application or a specific application (e.g., an application for a conference).

Referring to 4, a state in which a specific session (e.g., a conference) is in progress through a specific application (e.g., an application for a conference) is illustrated. FIG. 4 illustrates an embodiment in which the first graphical object 410a is displayed as a video call execution screen, the second graphical object 410b is displayed as a three-dimensional avatar configured by the counterpart device 280, and the third graphical object 410c is displayed a screen including a text message according to a format provided by a specific application. The at least one graphical object (e.g., the first graphical object 410a, the second graphical object 410b, and the third graphical object 410c) corresponding to the at least one counterpart device 280, according to an embodiment of the disclosure may be modified and displayed according to a display format provided by a device used by the second user. For example, when a counterpart device 280 corresponding to the first graphical object 410a is a smartphone including a two-dimensional flat type display, at least one graphical object (e.g., the second graphical object 410b and the third graphical object 410c) may be two-dimensionally displayed on the counterpart device 280 through a split screen (e.g., a multi-window screen). Furthermore, when the counterpart device 280 corresponding to the first graphical object 410a is a wearable device (e.g., the glasses-type wearable device 100), at least one graphical object (e.g., the second graphical object 410b and the third graphical object 410c) may be described, as illustrated in FIG. 4, as a virtual object in a three-dimensional space. Furthermore, according to an embodiment of the disclosure, even when the counterpart device 280 is a smartphone including a two-dimensional flat type display, at least one graphical object (e.g., the second graphical object 410b and the third graphical object 410c) may be displayed as a three-dimensional object. Furthermore, according to an embodiment of the disclosure, even when the counterpart device 280 is a wearable device (e.g., the glasses-type wearable device 100), at least one graphical object (e.g., the second graphical object 410b and the third graphical object 410c) may be displayed as a two-dimensional object. At least one graphical object (e.g., the fourth graphical object 420) may include an execution screen of a specific application (e.g., a video-providing application).

Referring to FIG. 4, an execution screen of one video-providing application the fourth graphical object 420 is illustrated, but an execution screen of multiple video-providing applications may be displayed as the fourth graphical object 420, and an execution screen of different types of applications (e.g., a gallery application and a video-providing application) may be displayed as the fourth graphical object 420 in a display area 400. According to an embodiment of the disclosure, a position and/or an order in which at least one graphical object (e.g., the first graphical object 410a, the second graphical object 410b, the third graphical object 410c, and the fourth graphical object 420) is displayed in the display area 400 may be predesignated. For example, as illustrated in FIG. 4, the fourth graphical object 420 may be displayed at a substantial center of the display area 400, and may be displayed counterclockwise from the upper left end of the display area 400 in the order in which the fourth graphical object 420 is connected to the glasses-type wearable device 100.

In operation 320, the glasses-type wearable device 100 may identify whether a first body part of a user (e.g., the first user) is positioned in a first area (e.g., a first area 510a or a first radius 510). The glasses-type wearable device 100 may compare a pre-stored template with an image acquired by the glasses-type wearable device 100 to identify the user's body part. Alternatively, according to another embodiment of the disclosure, the user's body part may be identified based on the result of learning according an artificial intelligence model. The artificial intelligence may include multiple artificial neural network layers. An artificial neural network may be one among a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-networks, or a combination of at least two thereof, but is not limited the above-mentioned examples.

Figure 5A:
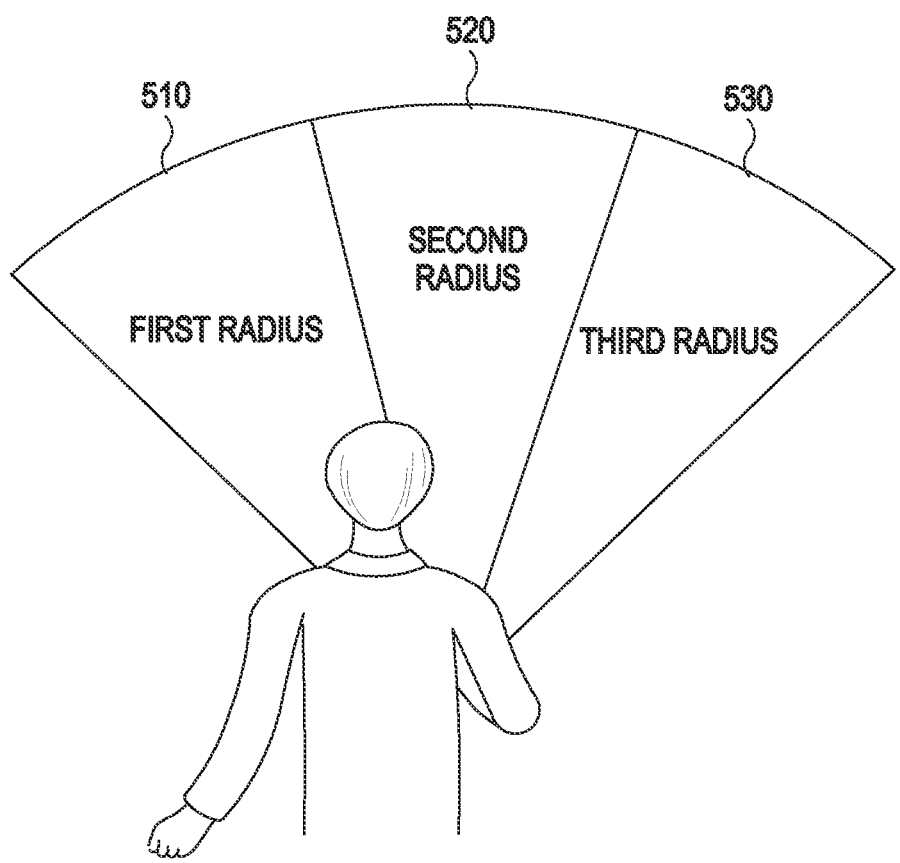
FIG. 5A is an illustration for describing at least one radius configured with reference to a glasses-type wearable device according to an embodiment of the disclosure.

FIG. 5A is an illustration for describing at least one radius configured to have an identical center with reference to a glasses-type wearable device according to an embodiment of the disclosure.

Figure 5B:
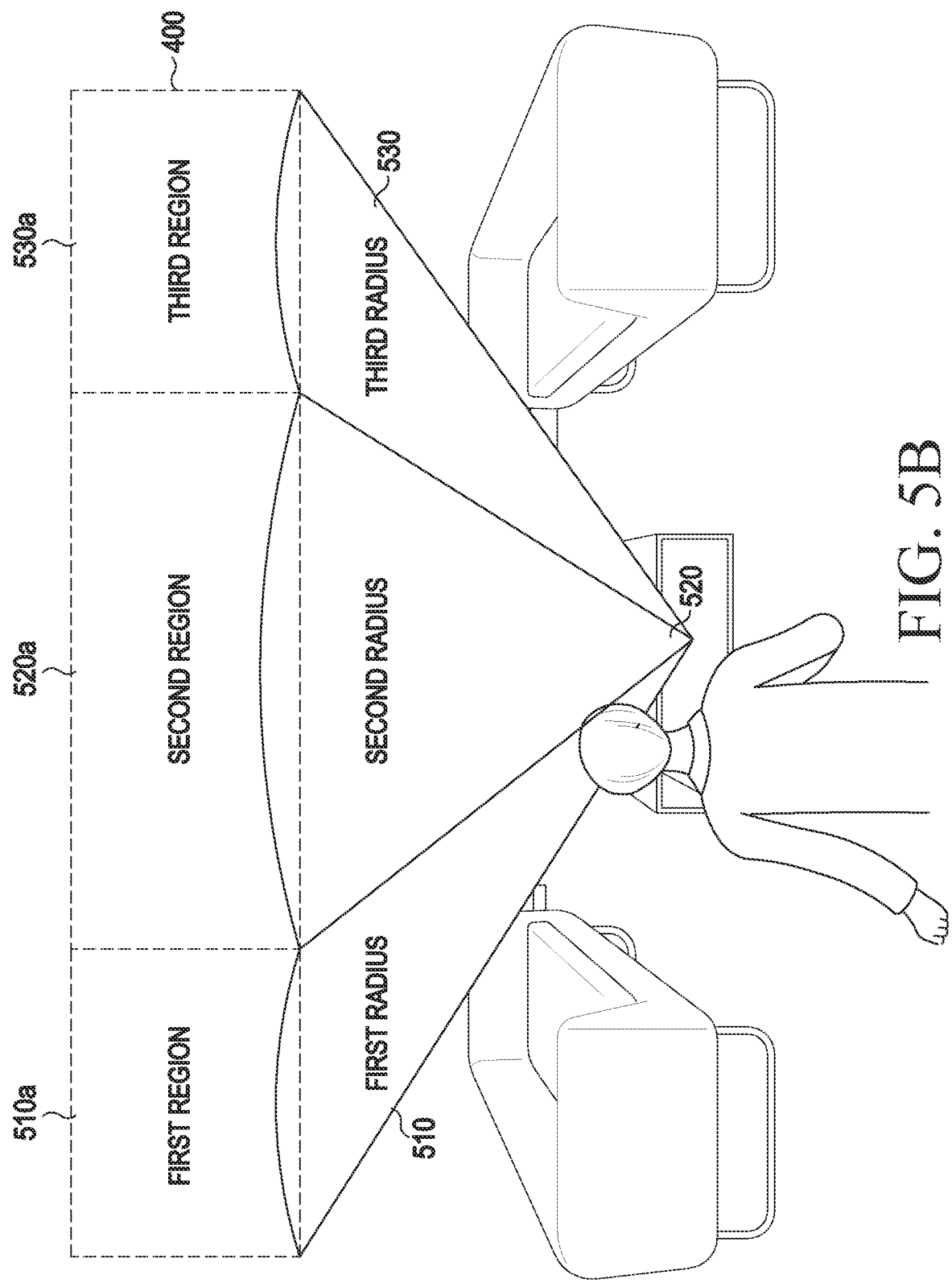
FIG. 5B is an illustration for describing at least one area configured in a display area as a method for determining whether a user's body part is positioned within at least one radius according to an embodiment of the disclosure.

FIG. 5B is an illustration for describing at least one area configured in a display area as a method for determining whether a first body part of a user is positioned within at least one radius area according to an embodiment of the disclosure.

Referring to FIG. 5A, the at least one radius area (e.g., a first radius area 510, a second radius area 520, and a third radius area 530) according to an embodiment of the disclosure may imply a two-dimensional area or a three-dimensional area configured to have a specific angle with respect to a first body part of a user (e.g., the right hand of the user). Furthermore, according to another embodiment of the disclosure, the at least one radius area (e.g., the first radius area 510, the second radius area 520, the third radius area 530) may imply a two-dimensional area or a three-dimensional area that is divided into multiple areas with reference to the field of view of a display module 160. Although not illustrated, at least one radius area (e.g., the first radius area 510 and the second radius area 520) may be configured to have different centers (e.g., a right hand and a left hand), respectively. In other words, the center of at least one radius area (e.g., the first radius area 510 and the second radius area 520) may be changed depending on whether the first body part of the user is the right hand or the left hand. According to an embodiment of the disclosure, in order to for the glasses-type wearable device 100 to identify whether the first body part (e.g., the right hand) of the user is positioned in a first area (e.g., the first area 510a or the first radius area 510), at least one area (e.g., the first area 510a, a second area 520a, a third area 530a) may be preconfigured with respect to the display area 400, referring to FIG. 5B. According to an embodiment of the disclosure, the size, area, or the number of at least one area (e.g., the first area 510a, the second area 520a, or the third area 530a) may be changed by the user's configuration. According to an embodiment of the disclosure, the at least one area (e.g., the first area 510a, the second area 520a, or the third area 530a) may be determined based on a position and/or a number in which at least one graphical object (e.g., the first graphical object 410a, the second graphical object 410b, the third graphical object 410c, and the fourth graphical object 420) are displayed. For example, when more graphical objects are displayed on the right side than on the left side with reference to the user's position, the area of at least one area (e.g., the first area 510a, the second area 520a, or the third area 530a) may be configured such that a radius area (e.g., the third radius area 530) configured at the right side with reference to the user covers a larger area than other radius areas.

The at least one area (e.g., the first area 510a, the second area 520a, or the third area 530a) may be configured based on coordinate values of the display area 400. For example, when the abscissa value of the display area 400 is configured to have a value of 0 to 1000, a range of 0-200 may be designated as the first area 510a, a range from greater than 200 to 800 may be designated as a second area 520a, and a range from greater than 800 to 1000 may be designated as a third area 530c. The above-mentioned designated at least one area (e.g., the first area 510a, the second area 520a, or the third area 530a) may correspond to the at least one radius area (e.g., the first radius area 510, the second radius area 520, and the third radius area 530).

Figure 5C:
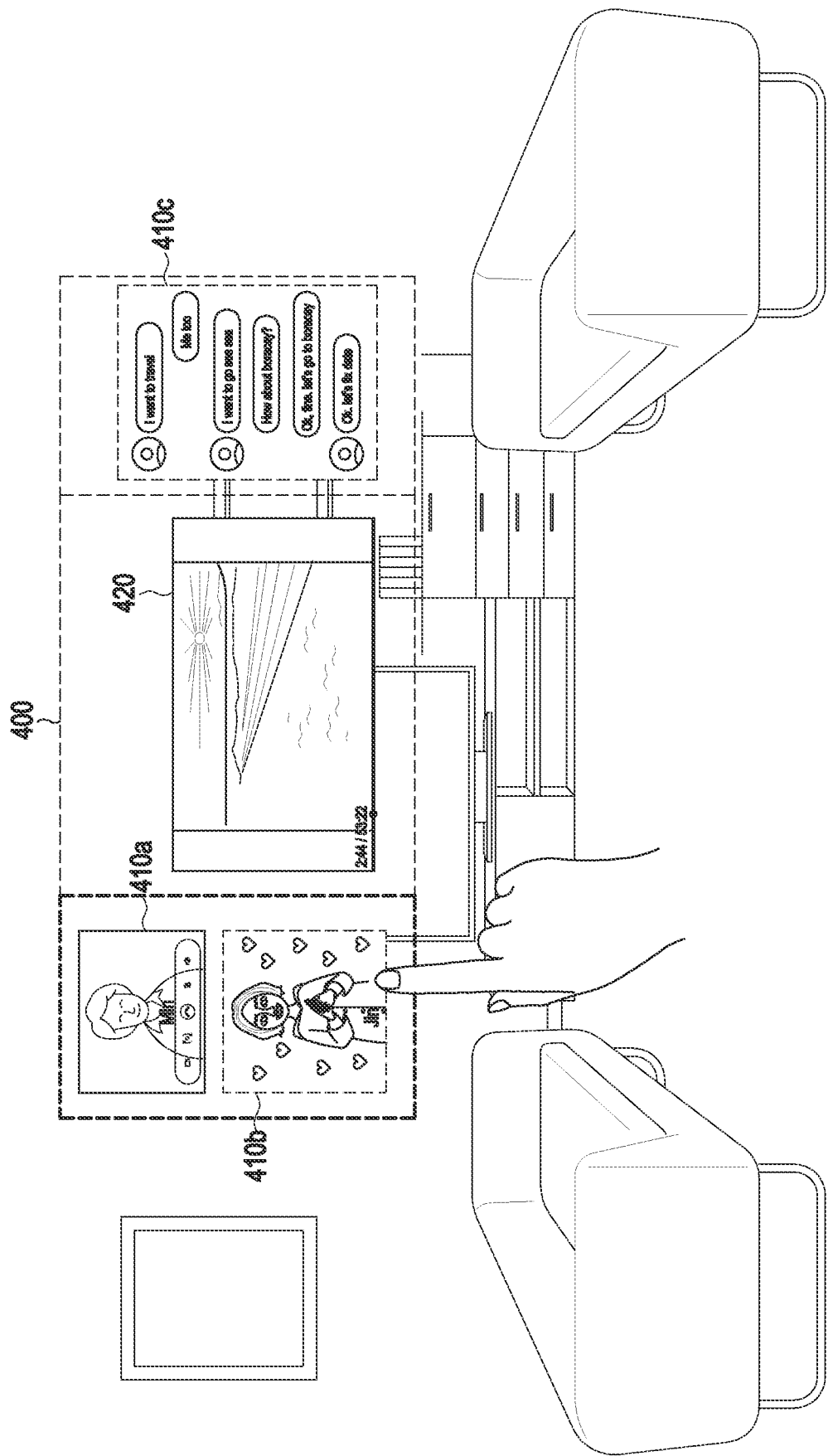
FIG. 5C is an illustration for describing a function or operation in which a glasses-type wearable device determines that a user's body part is positioned in a first radius when it is detected that the user's body part is positioned in a first area according to an embodiment of the disclosure.

FIG. 5C is an illustration for describing a function or operation in which a glasses-type wearable device determines that a first body part of a user is positioned in a first radius area when it is detected that the first body part of the user is positioned in a first area according to an embodiment of the disclosure.

Referring to FIG. 5C, when it is detected that the first body part (e.g., the right hand) of the user is positioned in the first area 510a, the glasses-type wearable device 100 may identify that the first body part of the user is positioned in the first radius area 510. When it is detected that the user's body part is positioned with a predetermined threshold area or larger in a specific area (e.g., the first area 510a), the glasses-type wearable device 100 may detect that the user's body part is positioned in the specific area (e.g., the first area 510a). For example, when the user's body part (e.g., the right hand) is over the second area 520a and the third area 530a, the glasses-type wearable device 100 according to an embodiment of the disclosure may detect (e.g., determine) that the user's body part is positioned in an area including a larger area of the user's body part. The wearable device 100 according to an embodiment of the disclosure may identify the first body part of the user by using at least one camera (e.g., the first camera 111).

Figure 5D:
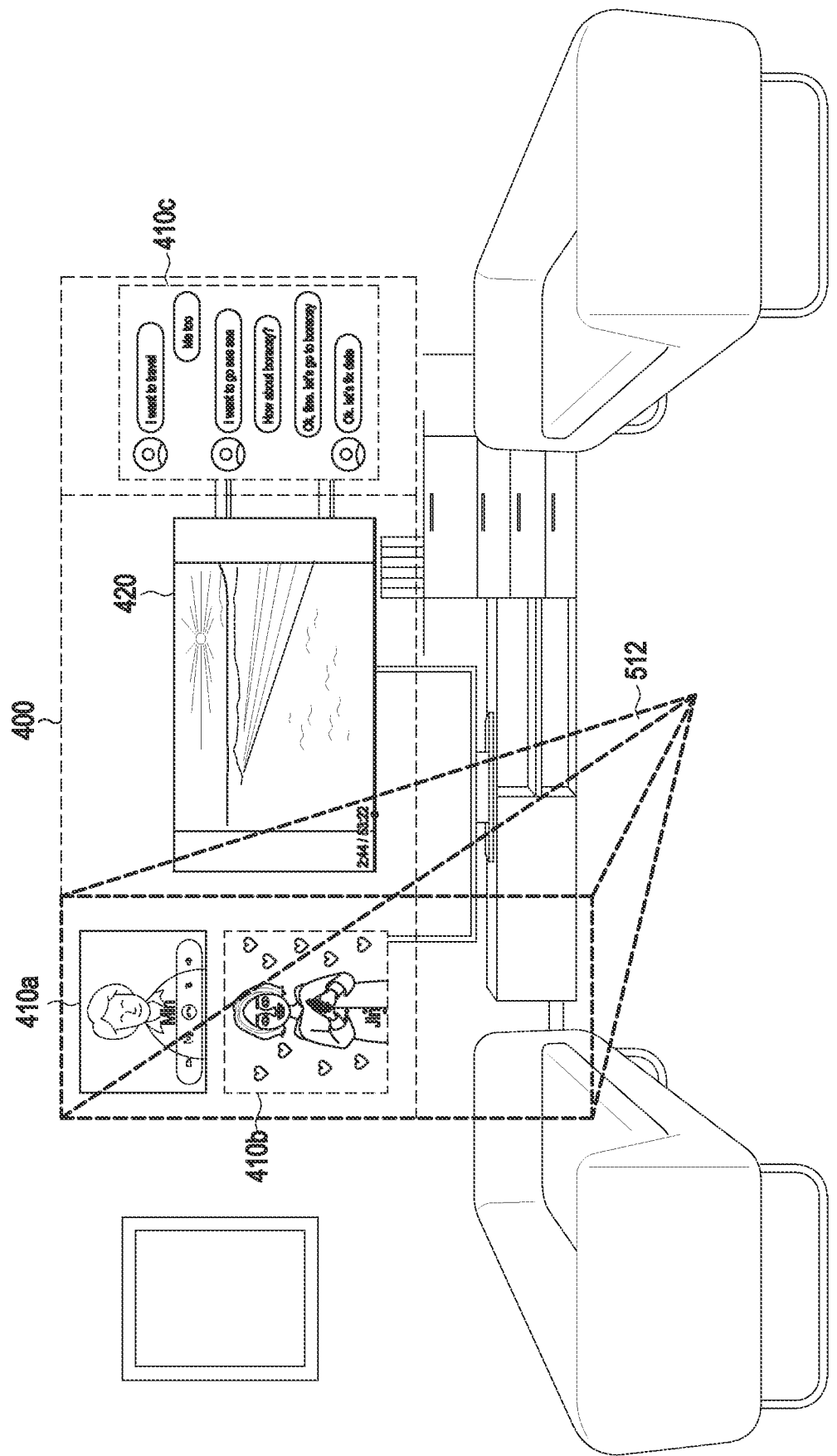
FIGS. 5D and 5E are illustrations for describing a function or operation in which a glasses-type wearable device determines that a user's body part is positioned in a first radius when it is detected that the user's body part is positioned in a space configured with reference to a first area according to various embodiments of the disclosure.
Figure 5E:
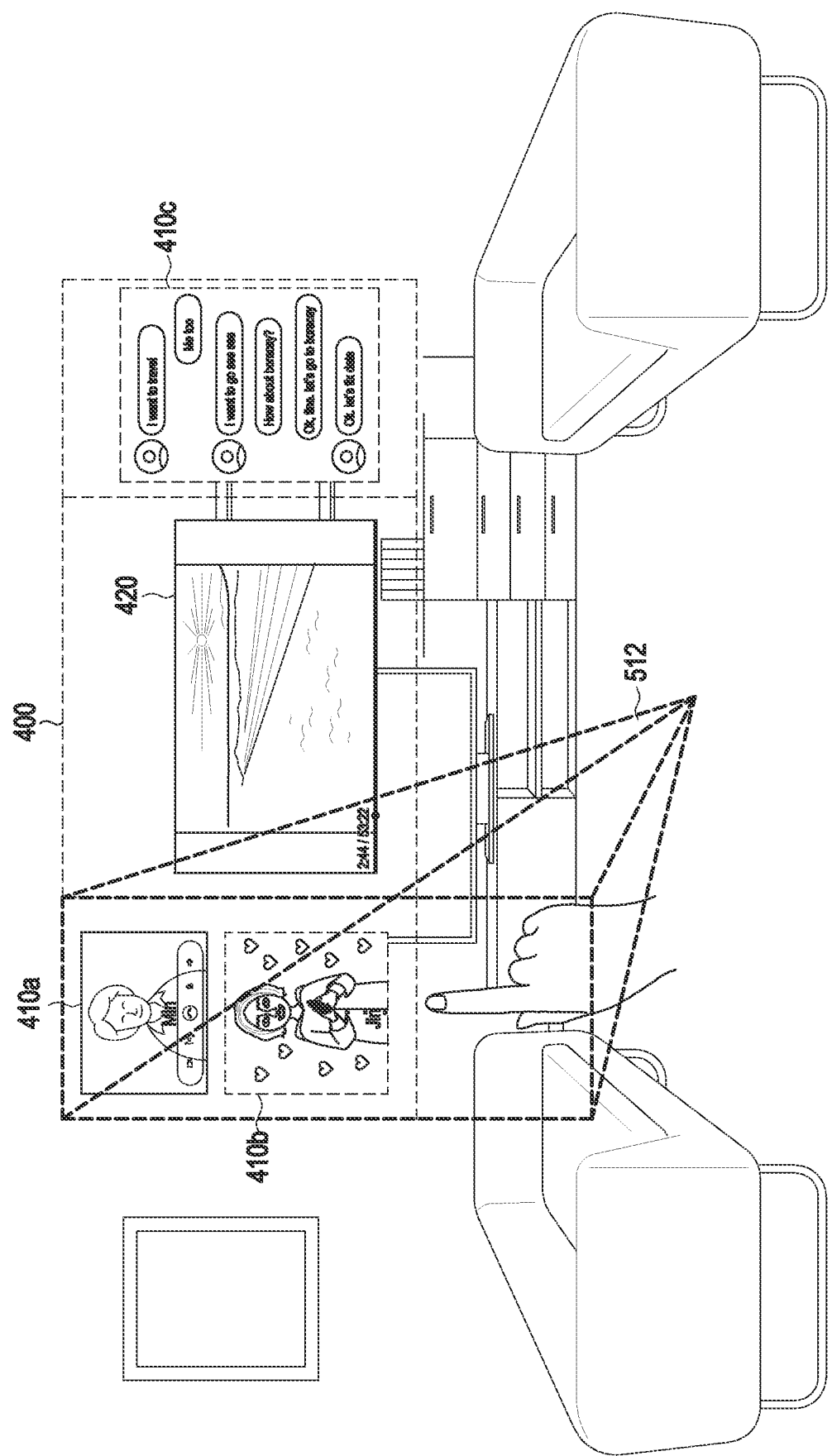

FIGS. 5D and 5E are illustrations for describing a function or operation in which a glasses-type wearable device determines that a first body part of a user is positioned in a first radius area when it is detected that the first body part of the user is positioned in a space configured with reference to a first area according to various embodiments of the disclosure.

Referring to FIGS. 5D and 5E, according to another embodiment of the disclosure, when it is detected that a first body part of a user is positioned in a space (e.g., a first space 512) configured in advance or based on the user's configuration with reference to the first area 510a, the wearable device 100 may identify that the first body part of the user is positioned in at least one radius area (e.g., the first radius area 510). In this case, as illustrated in FIG. 5E, even when the first body part of the user is not included in the display area 400, the glasses-type wearable device 100 may identify that the first body part of the user is positioned in the first radius area 510.

Figure 5F:
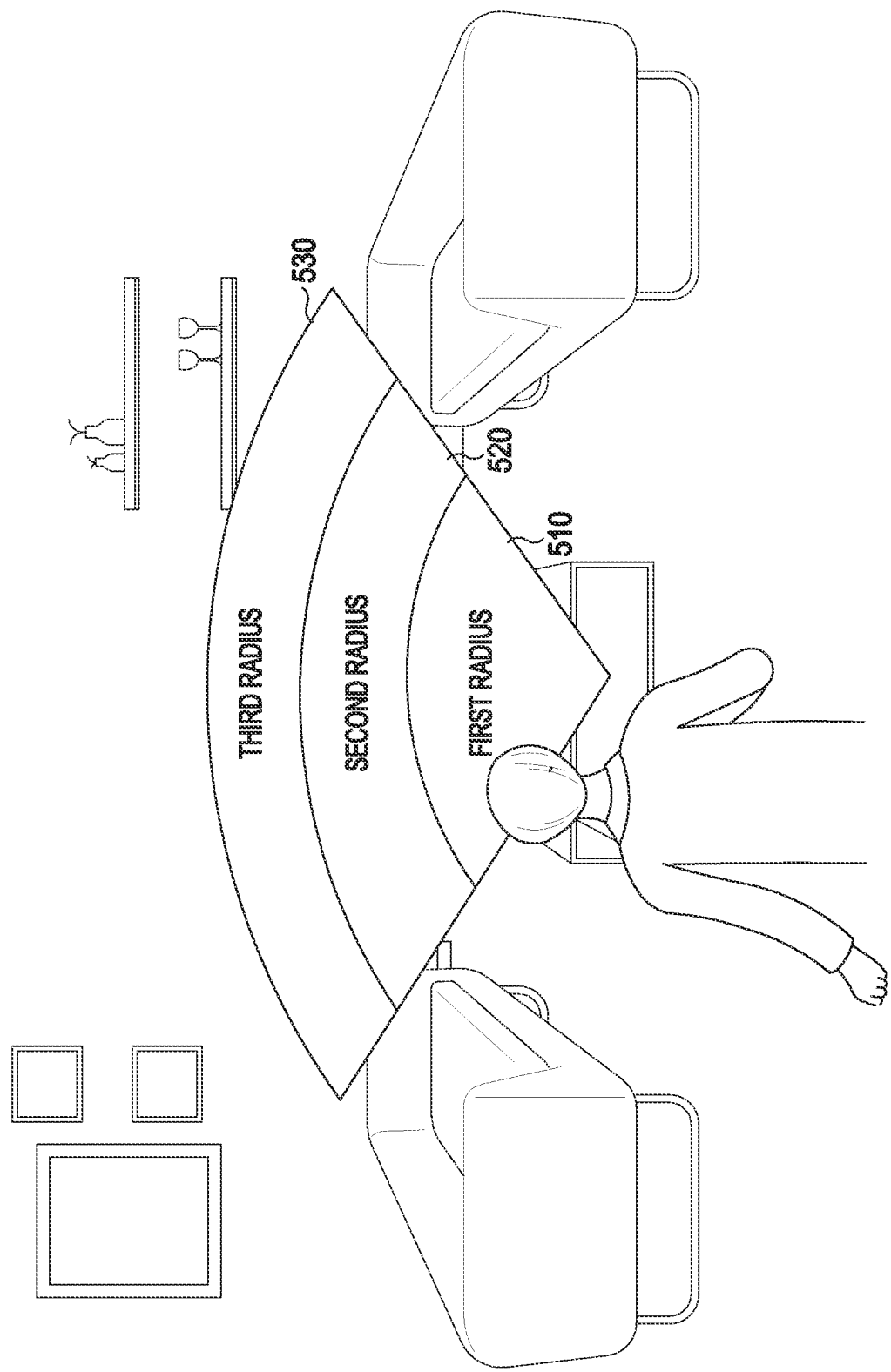
FIG. 5F is an illustration for describing a case in which at least one radius is configured according to an embodiment of the disclosure.

FIG. 5F is an illustration for describing a case in which at least one radius area is configured according to an embodiment of the disclosure.

Figure 5G:
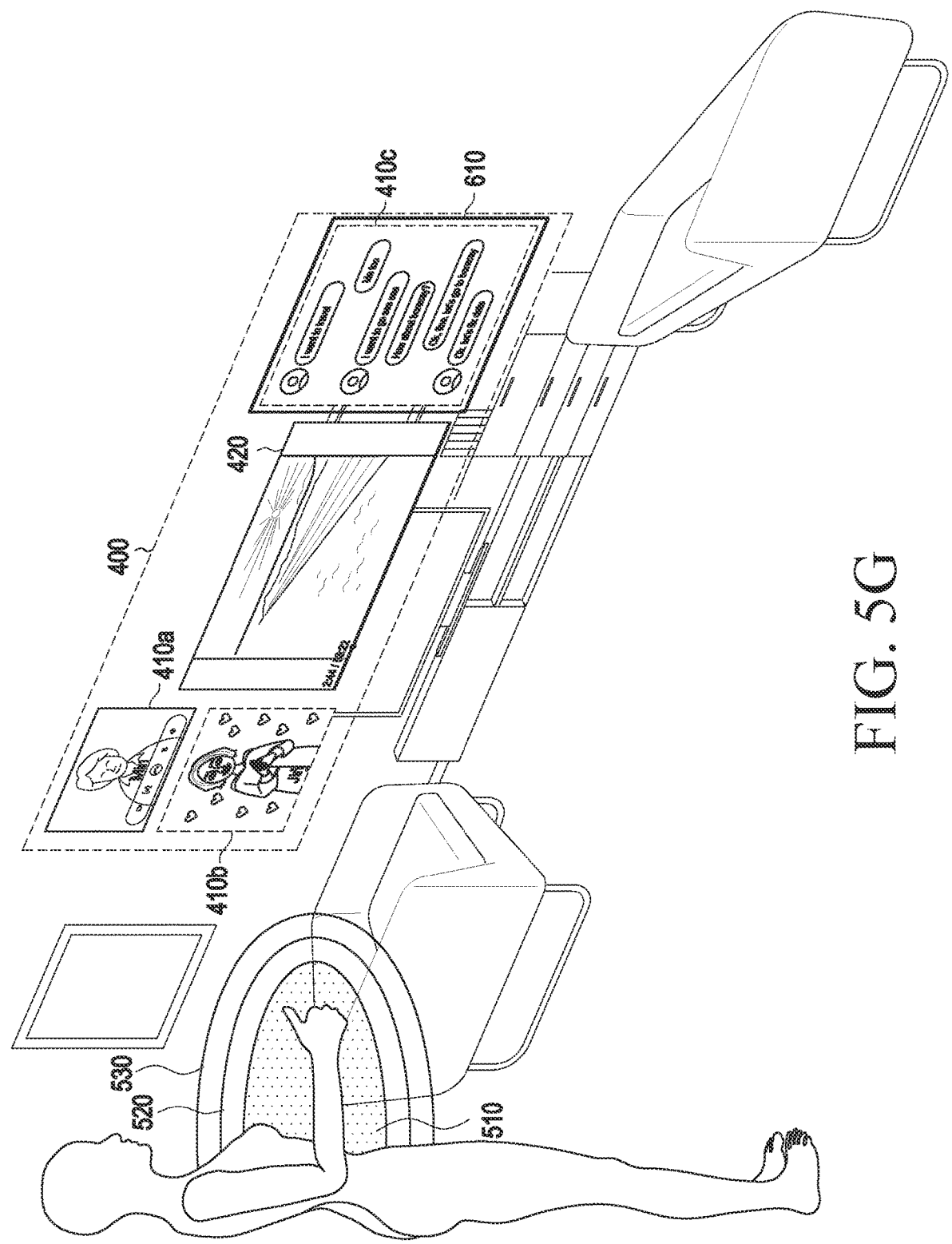
FIGS. 5G and 5H are illustrations for describing a function or operation in which, when at least one radius is configured, a glasses-type wearable device detects that a user's body part is positioned within the at least one radius according to various embodiments of the disclosure.
Figure 5H:
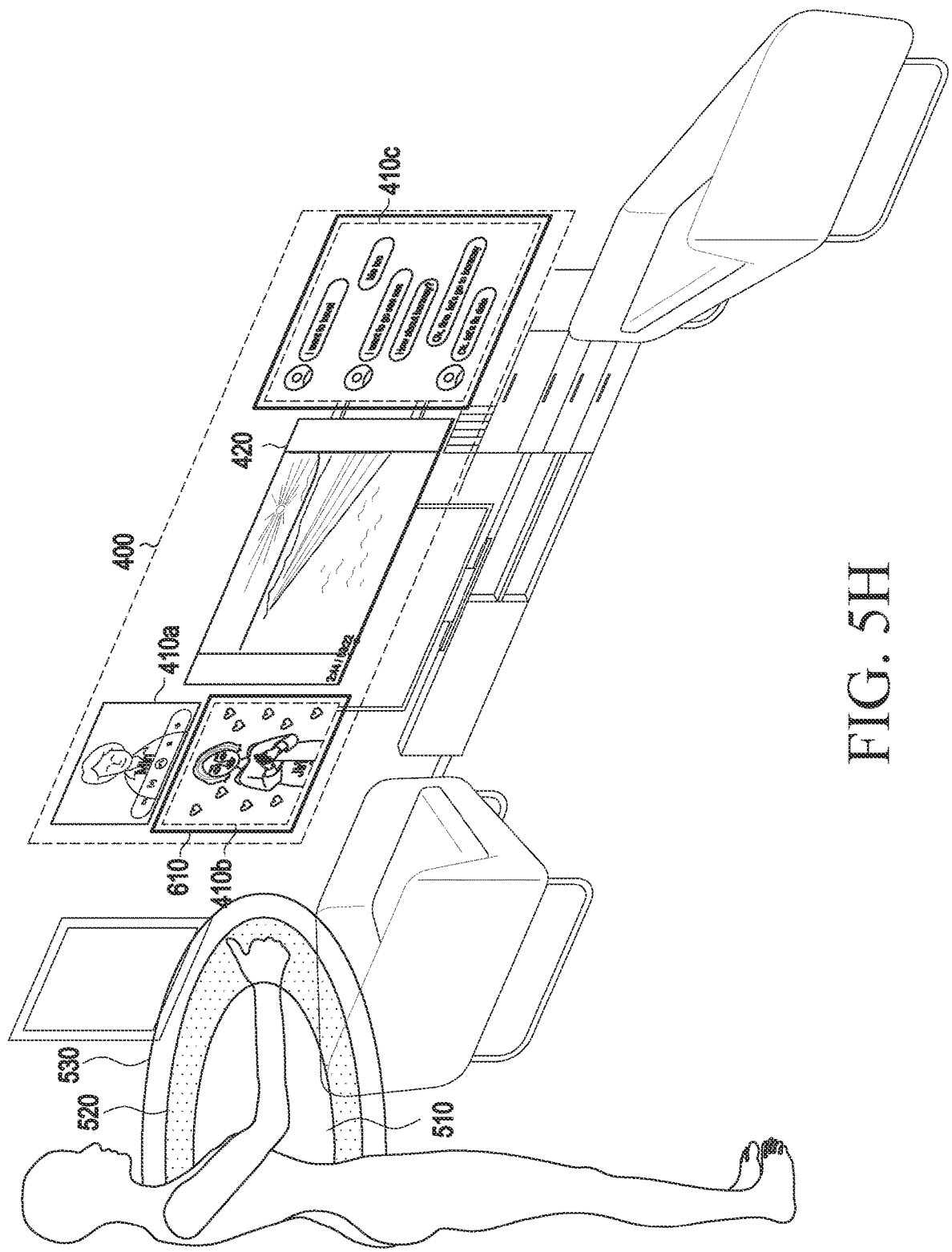

FIGS. 5G and 5H are illustrations for describing a function or operation in which, when at least one radius is configured, a glasses-type wearable device detects that a first body part of a user is positioned within the at least one radius area according to various embodiments of the disclosure.

Referring to FIG. 5F, radius areas (e.g., the first radius area 510, the second radius area 520, and the third radius area 530) according to an embodiment of the disclosure may be configured to be away from the user (e.g., in a horizontal direction with reference to the user's position). In this case, the glasses-type wearable device 100 according to an embodiment of the disclosure may determine, based on the distance by which a second body part of the user (e.g., an elbow or a part at which an arm is folded in the opposite direction to the elbow) is spaced apart from the glasses-type wearable device 100, whether the first body part (e.g., the right hand) of the user is positioned in a specific radius area (e.g., the first radius area 510, the second radius area 520, or the third radius area 530). In other words, the glasses-type wearable device 100 according to an embodiment of the disclosure may select different radius areas depending on the extent to which the user's arm is extended (e.g., the length of an arm). For example, the glasses-type wearable device 100 according to an embodiment of the disclosure may determine that the first body part (e.g., the right hand) of the user is included in the first radius area 510 within a range where the second body part (e.g., the elbow) of the user is not visible. Accordingly, referring to FIG. 5G, the glasses-type wearable device 100 may identify that the user's body part (e.g., right hand) is included in the first radius area 510. When the user's body part is detected within a predetermined distance by which the elbow is moved from a position in which the second body part (e.g., the elbow) of the user starts to be detected, the glasses-type wearable device 100 according to an embodiment of the disclosure may determine that the user's body part (e.g., the right hand) is included in the second radius area 520. Accordingly, referring to FIG. 5H, the glasses-type wearable device 100 may identify that the first body part (e.g., the right hand) of the user is included in the second radius area 520. The first body part (e.g., e.g., a body part that is a reference for identifying that the user's body part is included in a radius area) of the user and the second body part (e.g., a body part that is a reference for determining a radius area in which the user's body part is included) of the user, according to an embodiment of the disclosure, may be predesignated.

Figure 5I:
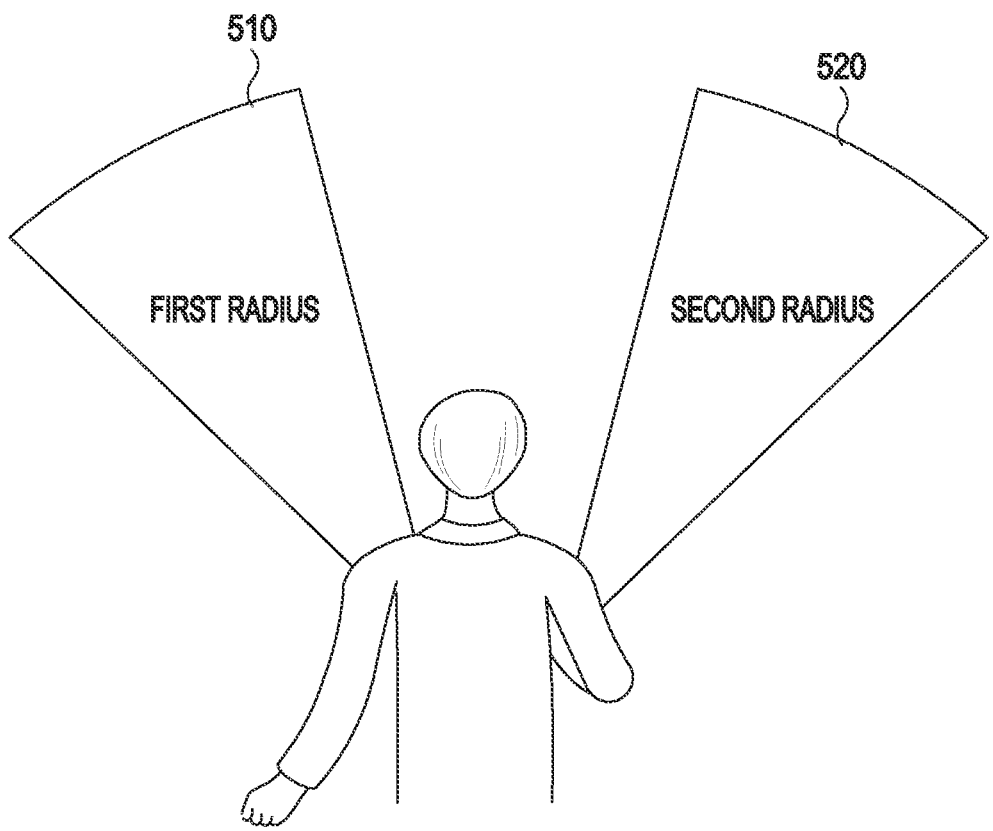
FIG. 5I is an illustration for describing a case in which at least one radius is configured according to an embodiment of the disclosure.

FIG. 5I is an illustration for describing a case in which at least one radius is configured according to an embodiment of the disclosure.

Referring to FIG. 5I, the radius areas (e.g., the first radius area 510 and the second radius area 520) may be configured based on different centers. Even in this case, specific areas (e.g., the first area 510a and the second area 520a) of the display area 400 corresponding to the radius areas (e.g., the first radius area 510 and the second radius area 520) may be preconfigured. Furthermore, a shading effect for indicating that a specific area has been selected, illustrated in FIGS. 5G and 5H, may not be shown to the user.

In operation 330, the glasses-type wearable device 100 may identify a group corresponding to the first area (e.g., the first area 510a), based on a fact that the user' body part (e.g., the right hand) is positioned in the first area (e.g., the first area 510a).

Figure 6A:
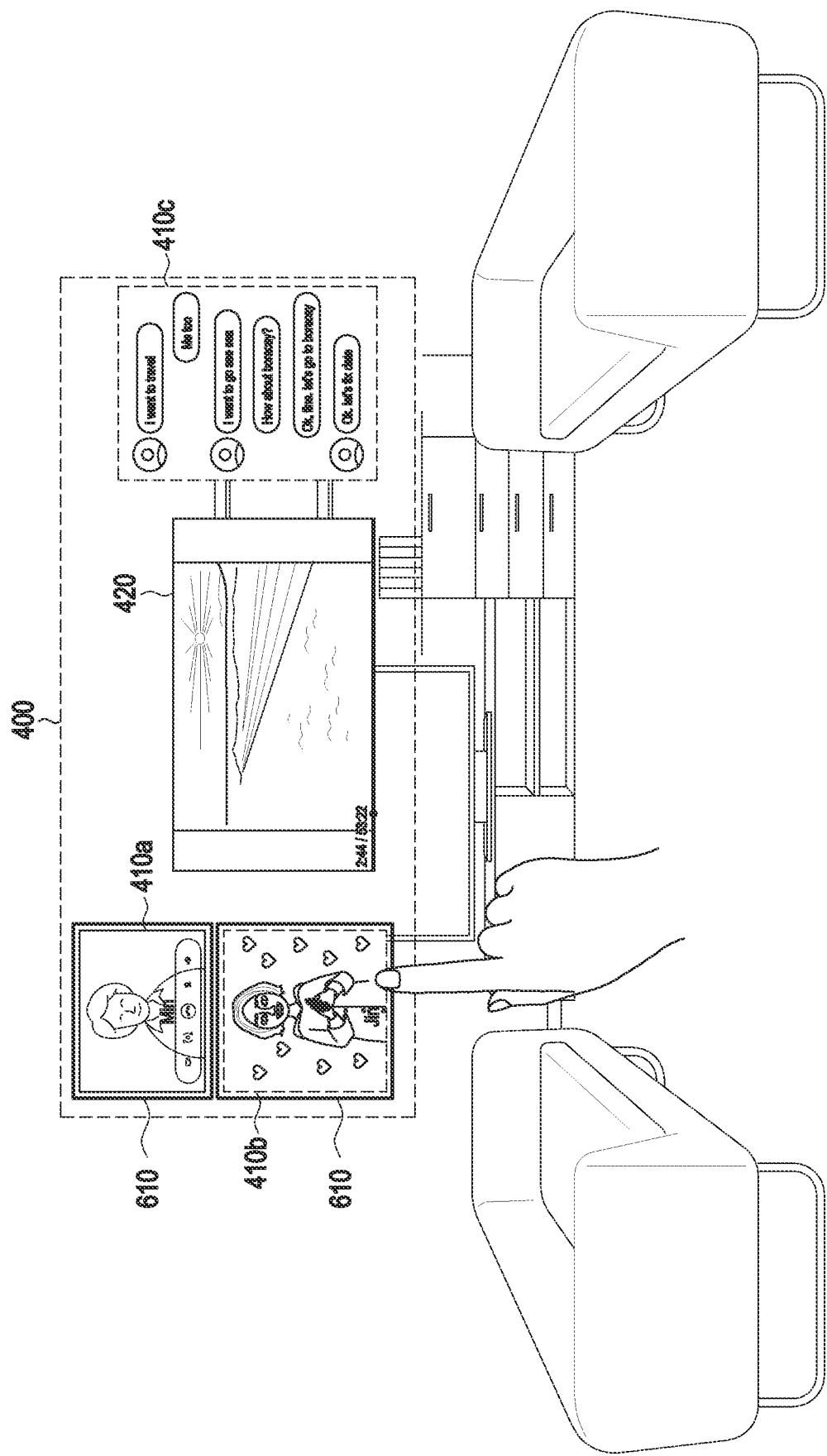
FIGS. 6A and 6B are illustrations for describing a group preconfigured to correspond to at least one radius according to various embodiments of the disclosure.
Figure 6B:
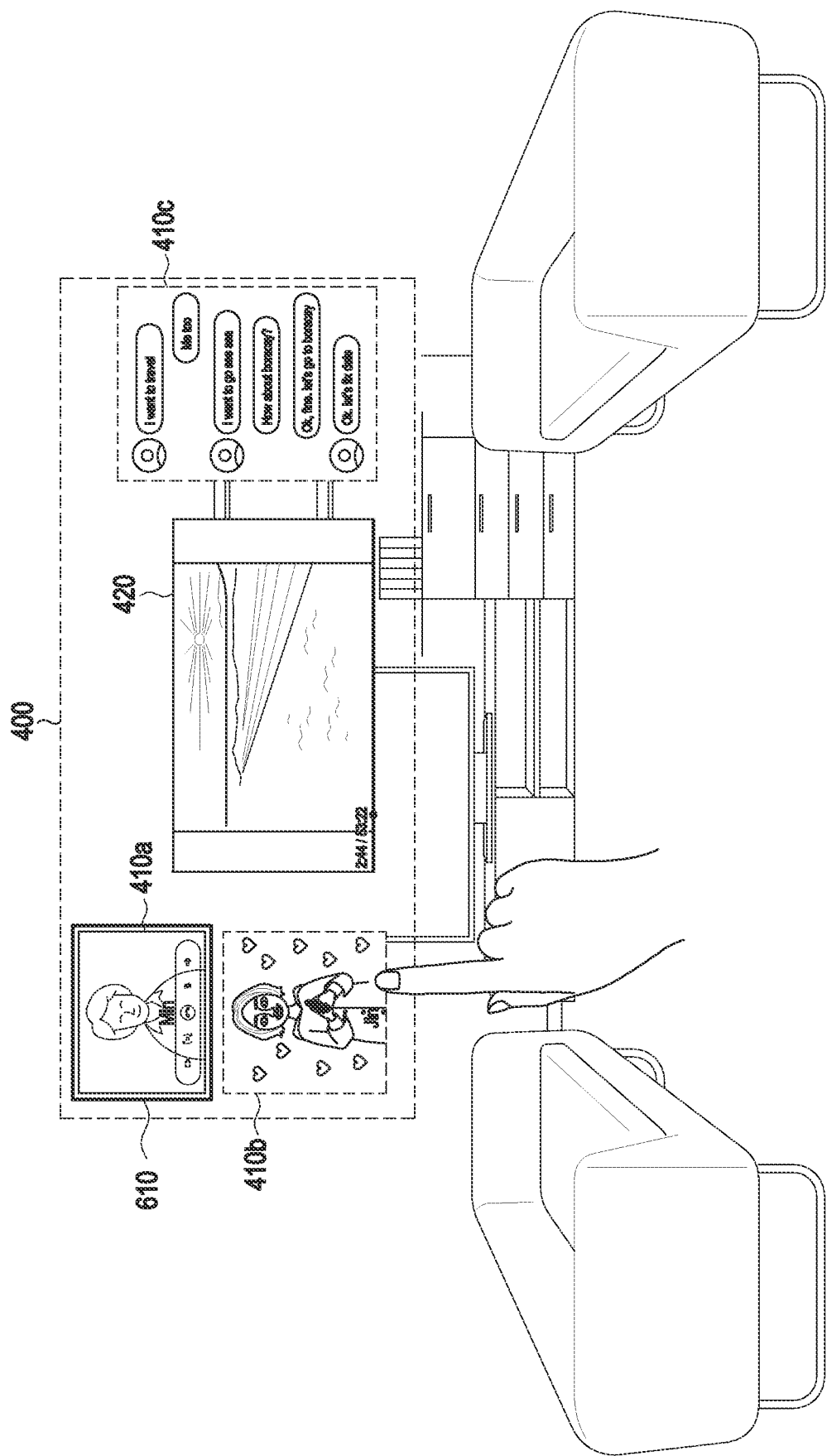

FIGS. 6A and 6B are illustrations for describing a group preconfigured to correspond to at least one radius according to various embodiments of the disclosure.

Referring to FIG. 6A, the glasses-type wearable device 100 may identify that the counterpart device 280 corresponding to the first graphical object 410a and the counterpart device 280 corresponding to the second graphical object 410b belong to the same group. The group may be configured to correspond to at least one radius area (e.g., the first radius area 510, the second radius area 520 and/or the third radius area 530). FIG. 6A illustrates an embodiment in which the counterpart device 280 corresponding to the first graphical object 410a and a counterpart device corresponding to the second graphical object 410b is configured by the user in advance (e.g., before execution of a conference application) to belong to the same group. When it is detected that the first body part (e.g., the right hand) of the user is positioned in the first radius area 510, the glasses-type wearable device 100 may display a visual effect (e.g., an edge) around at least one graphical object (e.g., the first graphical object 410a and the second graphical object 410b) belonging to a first group configured to correspond to the first radius area 510. However, the glasses-type wearable device 100 may provide an auditory effect (e.g., a predesignated sound) and/or a tactile effect (e.g., a vibration having a predesignated intensity) through the glasses-type wearable device 100. FIG. 6A illustrate an example in which the first graphical object 410a and the second graphical object 410b are configured as one group corresponding to the first radius area 510, and FIG. 6B illustrates an example in which the first graphical object 410a is configured as one group corresponding to the first radius area 510.

In operation 340, the glasses-type wearable device 100 may identify whether a trigger event is detected while the first body part of the user is positioned in the first area (e.g., the first radius area 510). The trigger event may include detection a predesignated gesture (e.g., a trigger gesture) by the first body part (e.g., the right hand) of the user or detection of a voice command of the user. According to an embodiment of the disclosure, when the trigger event includes detection of a voice command, the first body part of the user may be positioned in the first state. However, according to another embodiment of the disclosure, the first body part of the user may not be positioned in the first area.

Figure 7A:
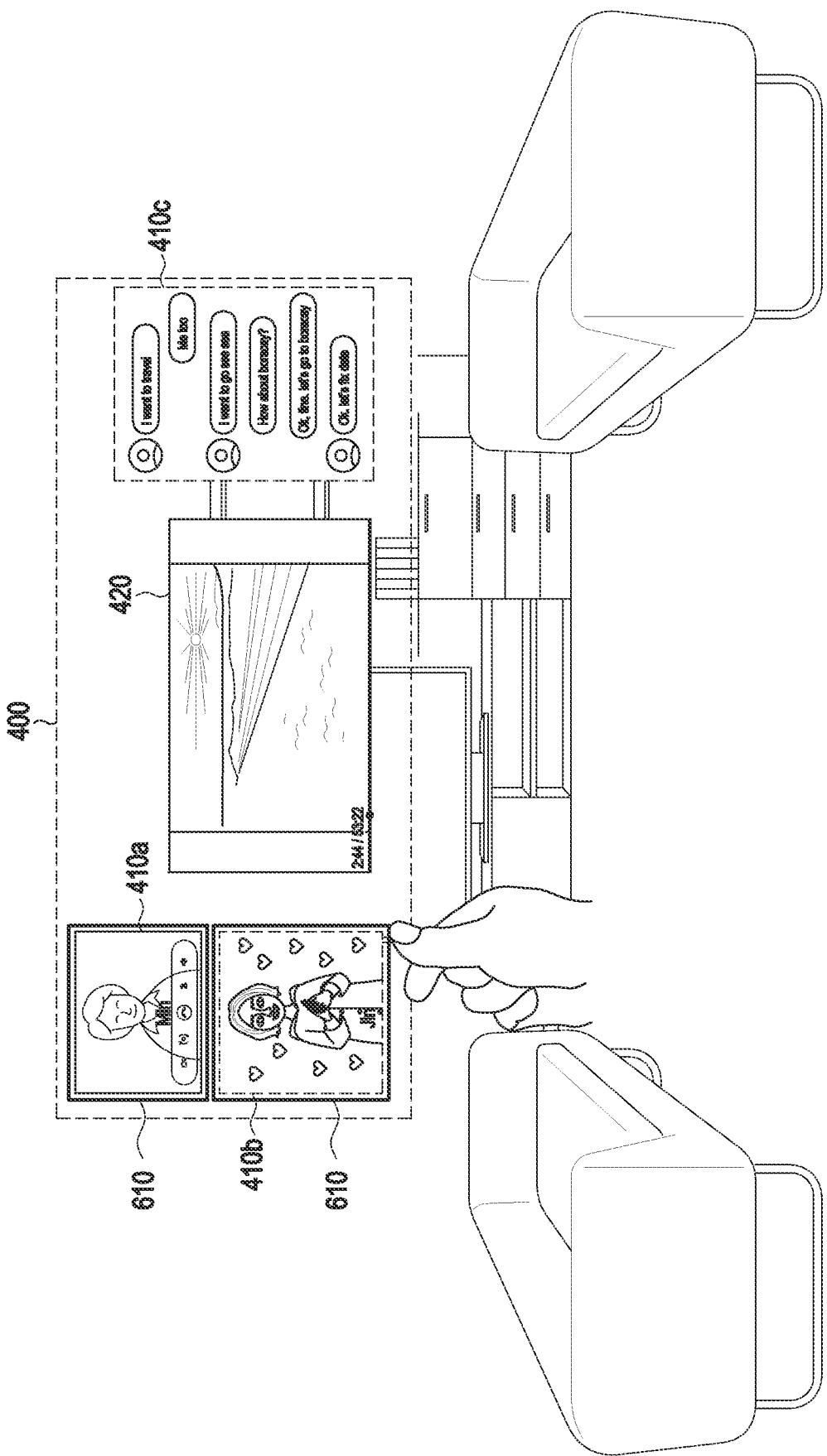
FIGS. 7A and 7B are illustrations for describing a trigger gesture according to various embodiments of the disclosure.
Figure 7B:
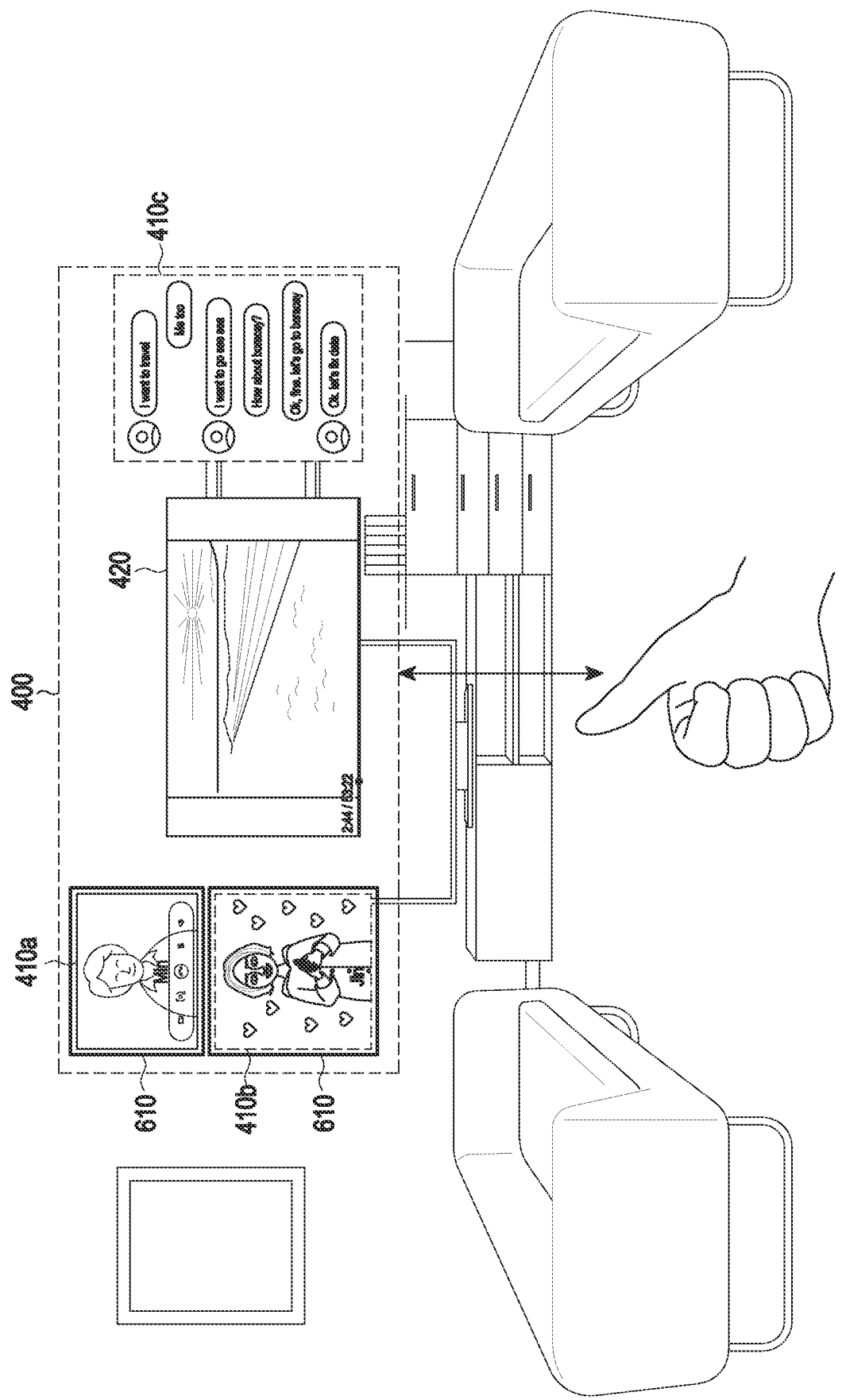

FIGS. 7A and 7B are illustrations for describing a trigger gesture according to various embodiments of the disclosure.

Referring to FIG. 7A, a heart gesture is illustrated as an example of a trigger gesture.

Referring to FIG. 7B, a gesture of moving a hand up and down with a raised thumb is illustrated as an example of a trigger gesture. According to another embodiment of the disclosure, the trigger event may include an event that detects a change in the facial expression of the user and/or the movement of the user's pupils. The glasses-type wearable device 100 may detect a change in the facial expression of the user and the movement of the user pupils by using an image of the user's face acquired through at least one camera (e.g., the second camera 112).

In operation 350, the glasses-type wearable device 100 according to an embodiment of the disclosure may perform, based on detection of the trigger event, a function corresponding to the trigger event with respect to the counterpart device 280 included in the identified group.

FIG. 8 is an illustration for describing a function or operation in which a specific function is performed by the glasses-type wearable device 100 based on a trigger event (e.g., detection of a trigger gesture) according to an embodiment of the disclosure.

Referring to FIG. 8, it illustrates an embodiment in which, when a trigger gesture is detected, a glasses-type wearable device according to an embodiment of the disclosure performs a function (e.g., transmission of a message including a heart) corresponding to the detected trigger event (e.g., the heart gesture) with respect to the counterpart device 280 belonging to a specific group. The message corresponding to the trigger event according to an embodiment of the disclosure may be displayed (e.g., two-dimensionally displayed) on a video call execution screen when a counterpart device is present at a corresponding session (e.g., a conference) through a video call using a smartphone. Alternatively, referring to FIG. 8, the message corresponding to the trigger event according to an embodiment of the disclosure may be displayed (e.g., three-dimensionally displayed) in the form of an emoticon 810 on a chatting window provided by a specific application. Alternatively, the message corresponding to the trigger event according to an embodiment of the disclosure may be transmitted as a short message service (SMS) message to the counterpart device 280. When describing with reference to FIG. 8, the message corresponding to the trigger event according to an embodiment of the disclosure may be transmitted to all counterpart devices 280 (e.g., a counterpart device corresponding to the first graphical object 410a and a counterpart device corresponding to the second graphical object 410b) of included in a group corresponding to the first radius area 510. In order to transmit the message corresponding to the trigger gesture to the counterpart device 280, the glasses-type wearable device 100 according to an embodiment of the disclosure may perform a function or operation of identifying the counterpart device 280 belonging to a specific group. According to an embodiment of the disclosure, after a visual effect 610 is displayed, the display state of the visual effect 610 may be maintained even when the user positions the first body part outside the first area (e.g., the first radius area 510), and a specific function based on the detection of the trigger event may be performed for all counterpart devices 280 (e.g., a counterpart device corresponding to the first graphical object 410a and a counterpart device corresponding to the second graphical object 410b) included in a group corresponding to the first area (e.g., the first radius area 510). Alternatively, after the visual effect 610 is displayed, when the user positions the first body part outside the first area (e.g., the first radius area 510), the visual effect 610 may no longer be displayed, and the specific function may be controlled not to be performed by the glasses-type wearable device 100 even when a trigger event is detected (e.g., detection of a heart gesture). According to another embodiment of the disclosure, when it is detected that the user's pupils move a predesignated distance or more or that the facial expression of the user is changed from a first state to a second state, the glasses-type wearable device 100 may perform a specific function. According to an embodiment of the disclosure, the glasses-type wearable device 100 may use a template for a facial expression, stored in the memory 140, to detect a change in the facial expression of the user. The glasses-type wearable device 100 may compare the template with a facial expression of the user in the acquired image, and when a matching ratio is equal to or greater than a predesignated ratio, may determine that the facial expression of the user is in a specific state (e.g., a smiling state). Alternatively, a function or operation of determining the facial expression of the user may be learned by an artificial intelligence model.

Figure 9:
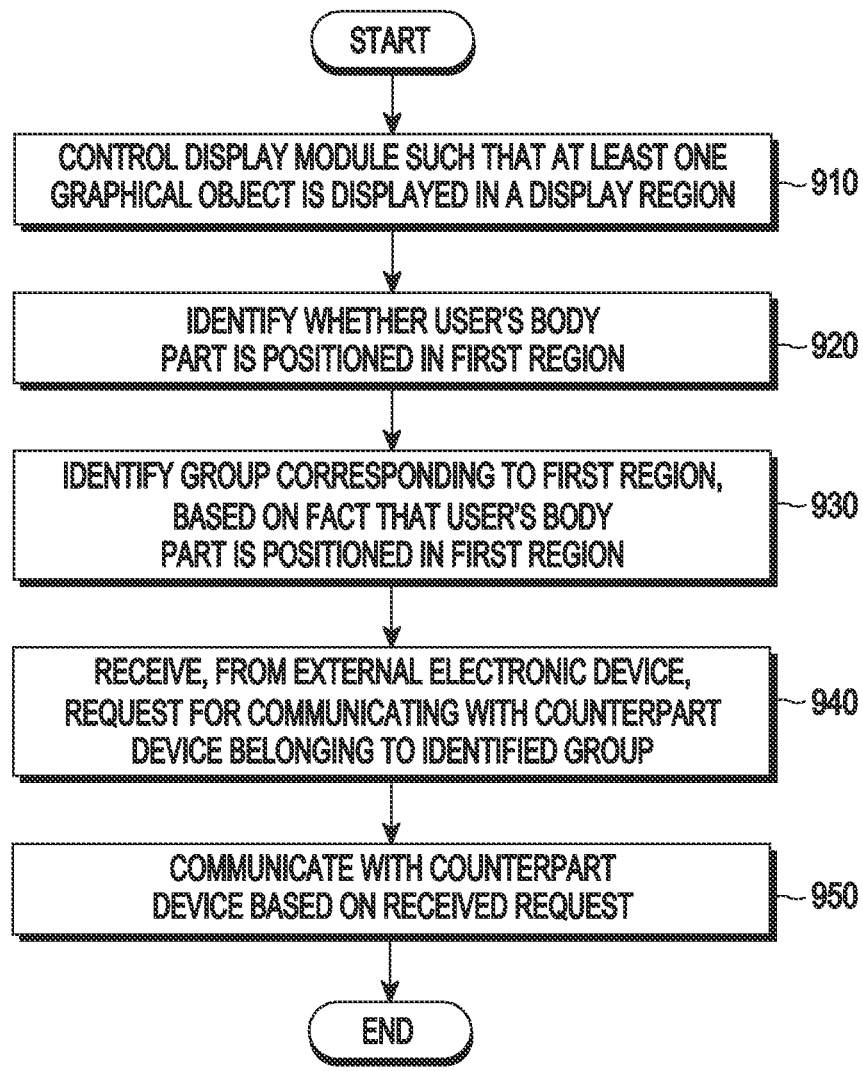
FIG. 9 is an illustration for describing a function or operation in which a glasses-type wearable device communicates with (e.g., transmits a text message to) at least one counterpart device, based on reception of a communication signal from an external electronic device operably connected to the glasses-type wearable device according to an embodiment of the disclosure.

FIG. 9 is an illustration for describing a function or operation of performing, by a glasses-type wearable device, communication with (e.g., transmission of a text message to) at least one counterpart device, based on reception of a communication signal from an external electronic device operably connected to the glasses-type wearable device according to an embodiment of the disclosure.

Referring to FIG. 9, in operation 910, the glasses-type wearable device 100 may control the display module 150 such that at least one graphical object (e.g., the first graphical object 410a, the second graphical object 410b, the third graphical object 410c, and the fourth graphical object 420) is displayed on the display area 400. In operation 920, the glasses-type wearable device 100 may identify whether a first body part of a user (e.g., the first user) is positioned in a first area (e.g., the first area 510a or the first radius 510). In operation 930, the glasses-type wearable device 100 may identify a group corresponding to the first area (e.g., the first area 510a), based on a fact that the user's body part (e.g., the right hand) is positioned in the first area (e.g., the first area 510a). The above description of operations 310 to 330 may be applied to operations 910 to 930 according to an embodiment of the disclosure, and thus the detailed description thereof will be omitted.

In operation 940, the glasses-type wearable device 100 according to an embodiment of the disclosure may receive, from an external electronic device (e.g., a smartphone) 1000, a request for communicating with the counterpart device 280 belonging to the identified group (e.g., the first graphical object 410a and the third graphical object 410c) (e.g., transmitting a text message input in the smartphone). In operation 950, the glasses-type wearable device 100 according to an embodiment of the disclosure may communicate with a counterpart device, based on the received request.

Figure 10A:
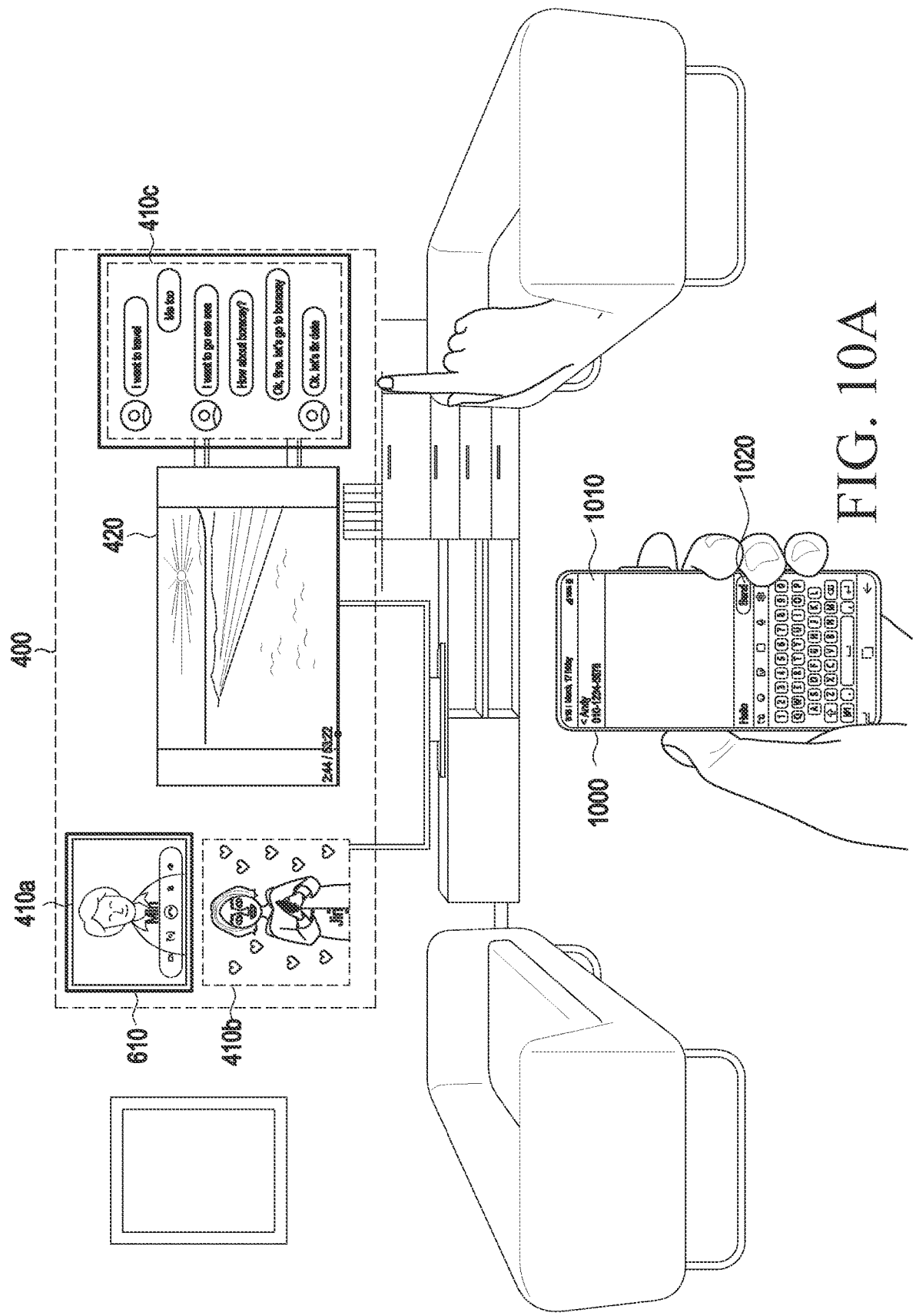
FIGS. 10A, 10B, and 10C are illustrations for describing a function or operation described in FIG. 9 in terms of view of a graphical user interface according to various embodiments of the disclosure.
Figure 10B:
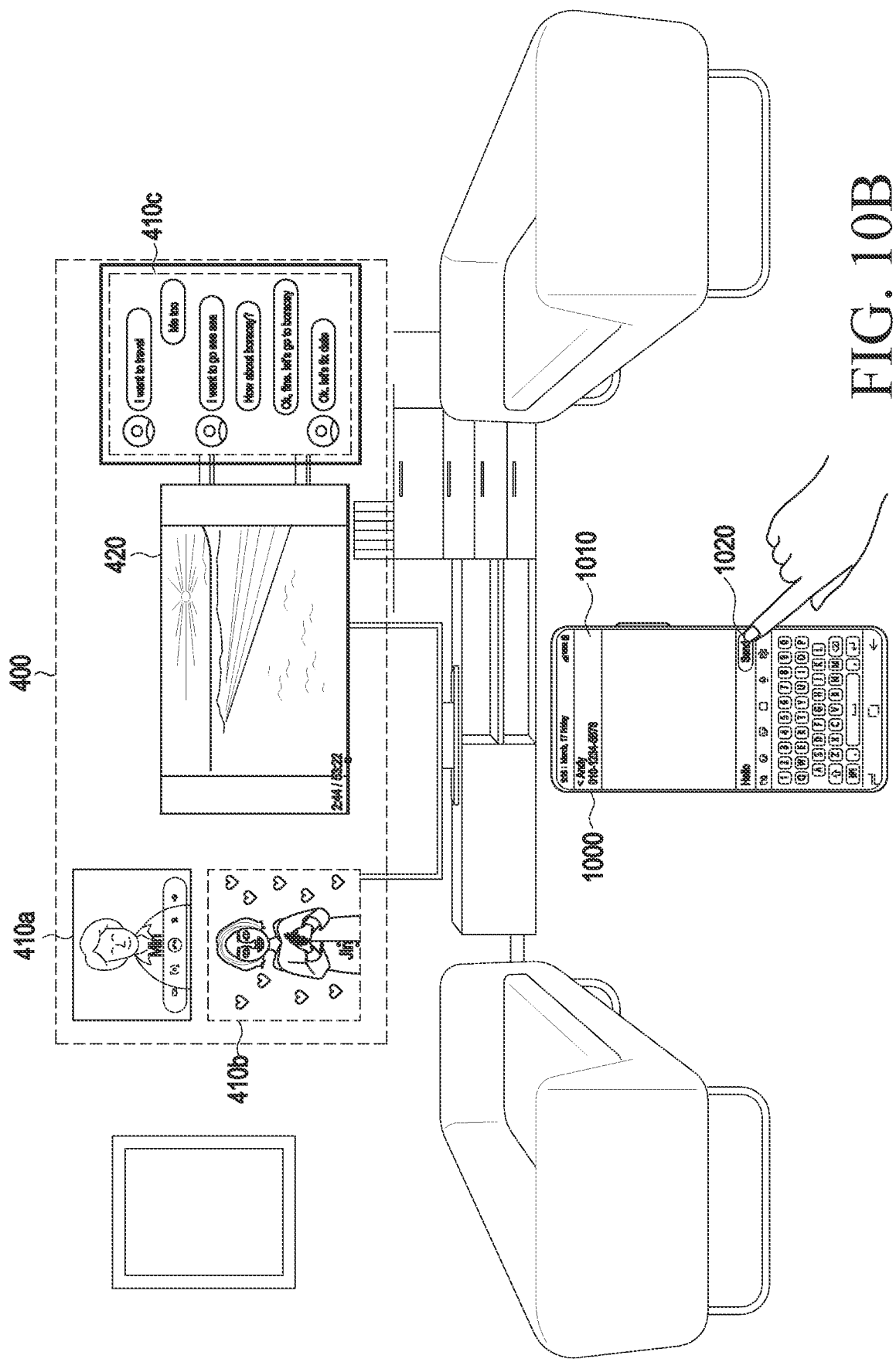
Figure 10C:
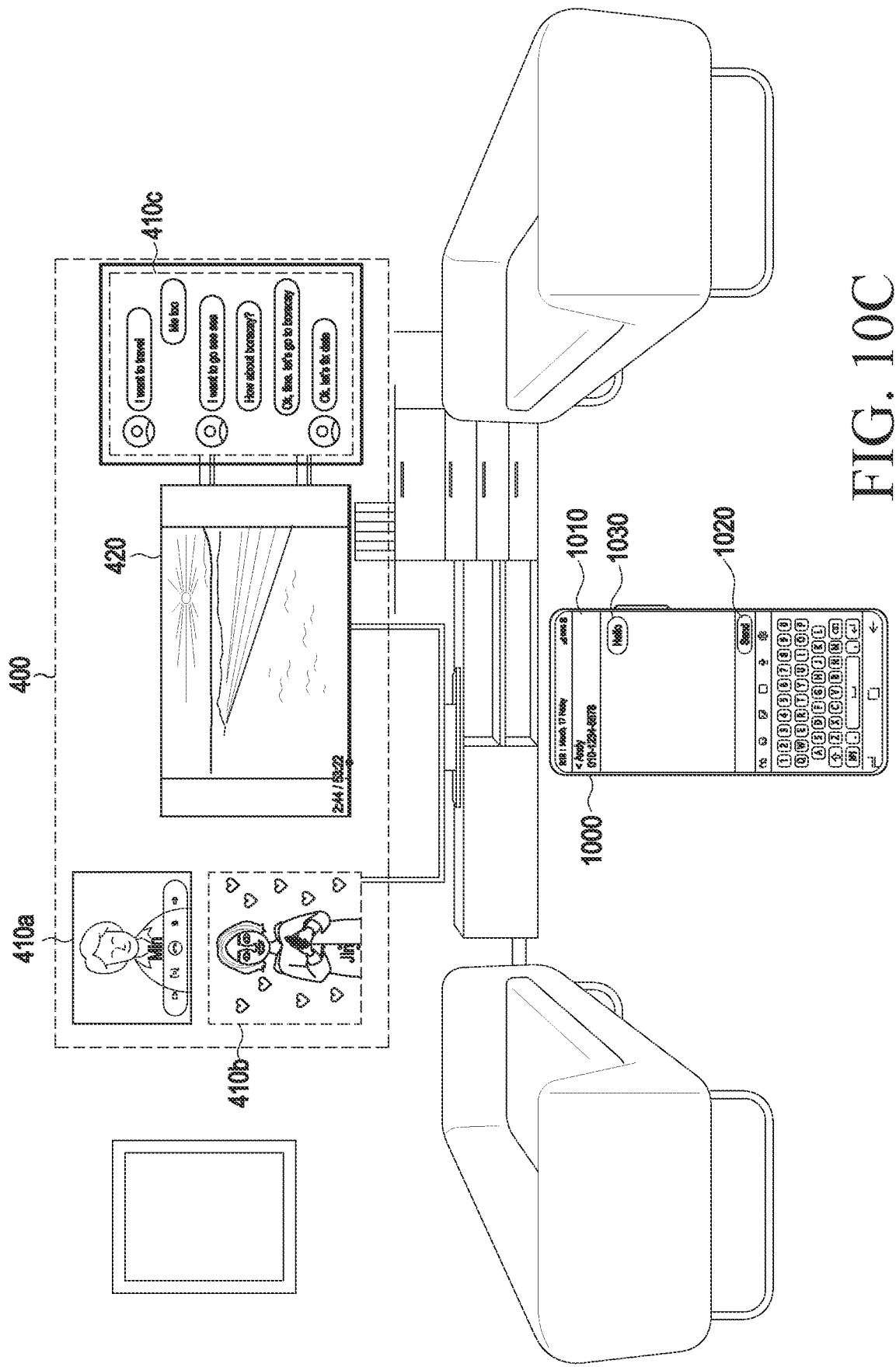

FIGS. 10A, 10B, and 10C are illustrations for describing a function or operation described in FIG. 9 in terms of view of a graphical user interface according to various embodiments of the disclosure.

Referring to FIGS. 10A, 10B, and 10C, an external electronic device (e.g., a smartphone) according to an embodiment of the disclosure may be operably connected to the glasses-type wearable device 100 through wired communication or wireless communication. Referring to FIG. 10B, when a signal indicating that a "send" button 1020 of the external electronic device has been selected is received from the external electronic device (e.g., the smartphone), the glasses-type wearable device 100 according to an embodiment of the disclosure may receive information about text input from the external electronic device and may transmit a text message to the counterpart device 280 belonging to the identified group (e.g., the first graphical object 410*a* and the third graphical object 410*c*). Referring to FIG. 10C, after the text message is transmitted, a transmitted text 1030 may be displayed on an execution screen 1010 of an application (e.g., a text message application). According to another embodiment of the disclosure, when a signal indicating that the "send" button 1020 of the external electronic device 1000 has been selected as illustrated in FIG. 10B is received from the external electronic device (e.g., the smartphone), the external electronic device 1000 may be controlled such that a text message including input text (e.g., Hello) is transmitted to the identified counterpart device 280. According to an embodiment of the disclosure, while operation 940 and operation 950 are performed, the position of the first body part (e.g., the right hand) of the user may not be maintained in the first area (e.g., the first radius area 510). Referring to FIG. 10A, FIGS. 10B and 10C illustrate embodiments in which the position of the first body part (e.g., the right hand) of the user is not maintained in the first area (e.g., the first radius area 510) after a specific group is detected based on the detection of the first body part (e.g., the right hand) of the user. However, according to another embodiment of the disclosure, operations 940 and 950 may performed only when the position of the first body part (e.g., the right hand) of the user is maintained in the first area (e.g., the first radius area 510) from a time at which operation 930 is performed.

Figure 11:
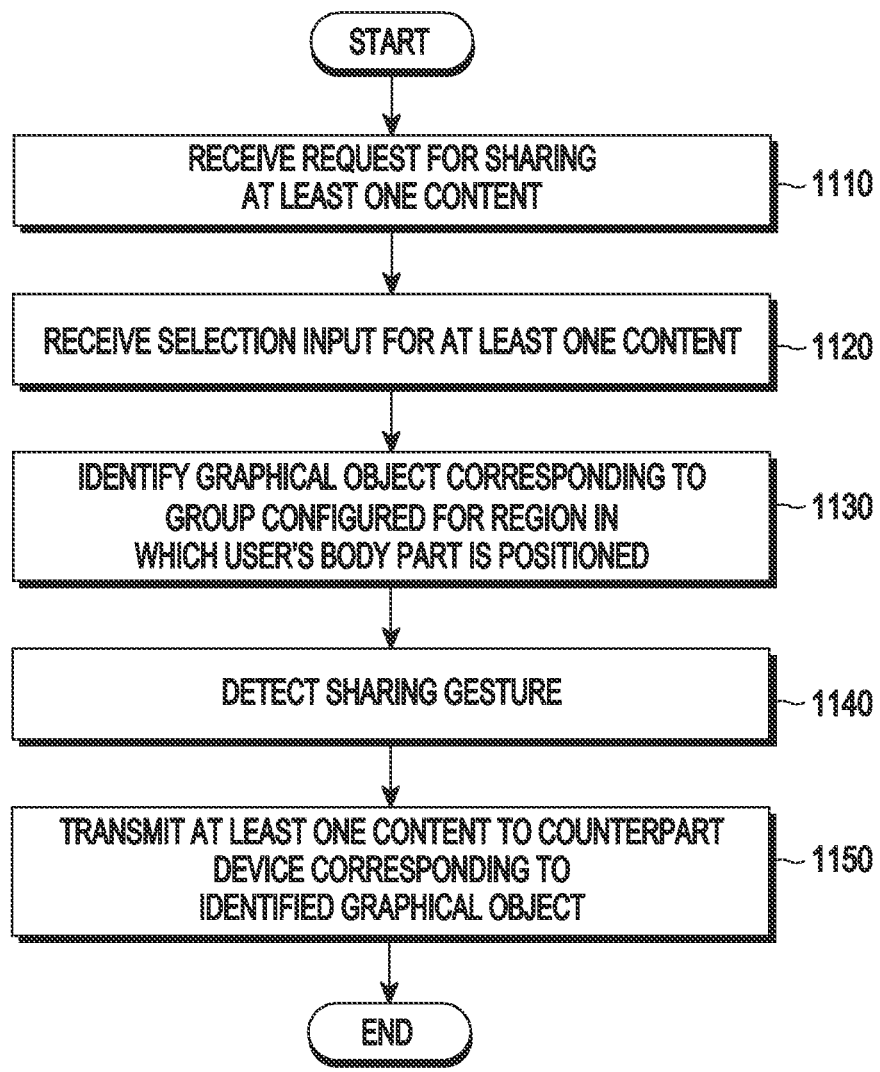
FIG. 11 is an illustration for describing a function or operation in which a glasses-type wearable device herein shares at least one content with at least one counterpart device when a sharing gesture is detected according to an embodiment of the disclosure.

FIG. 11 is an illustration for describing a function or operation in which a glasses-type wearable device shares at least one content with at least one counterpart device when a sharing gesture is detected according to an embodiment of the disclosure.

Figure 12A:
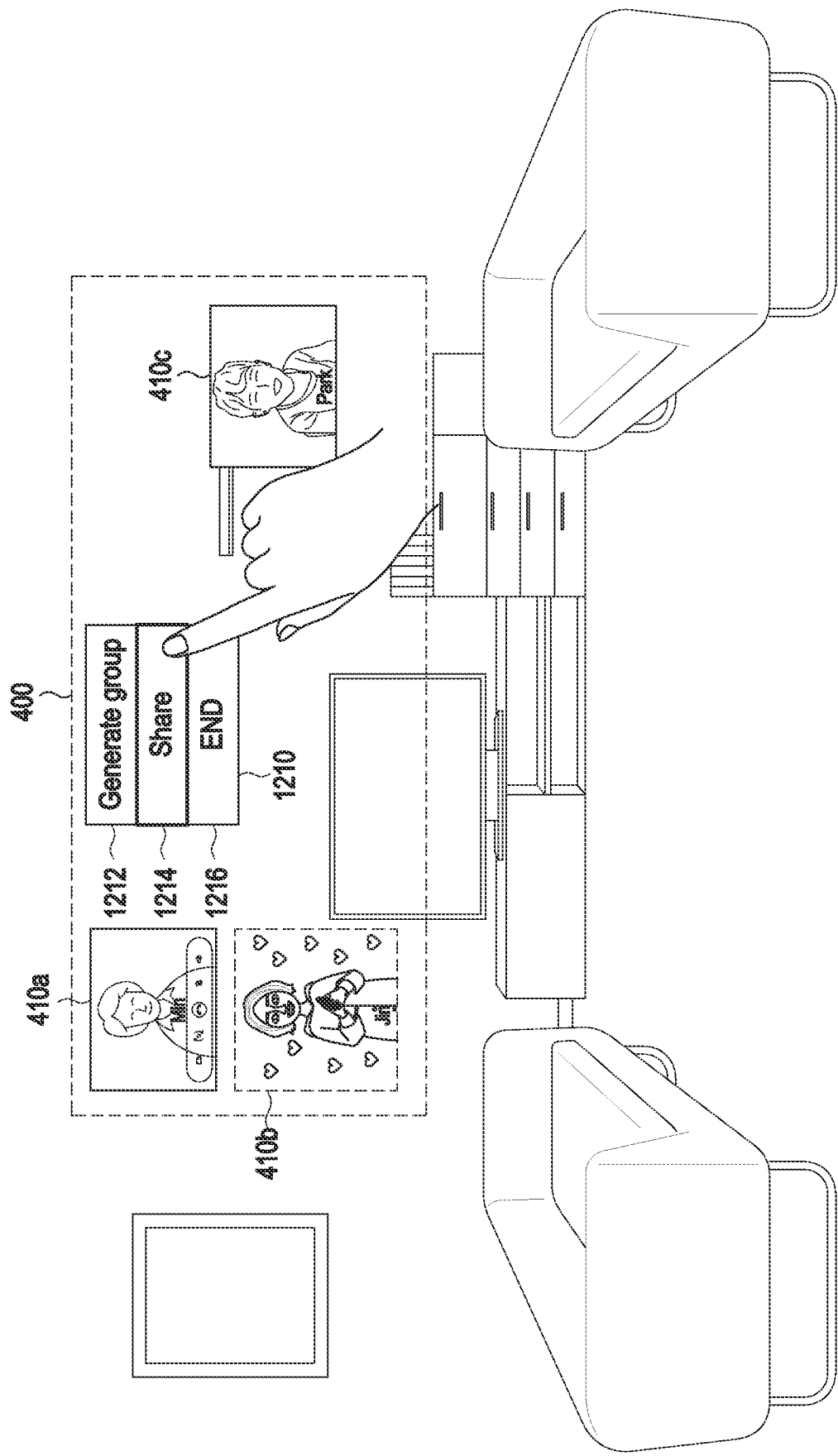
FIGS. 12A, 12B, and 12C are illustrations for describing a function or operation described in FIG. 11 in terms of a graphical user interface according to various embodiments of the disclosure.
Figure 12B:
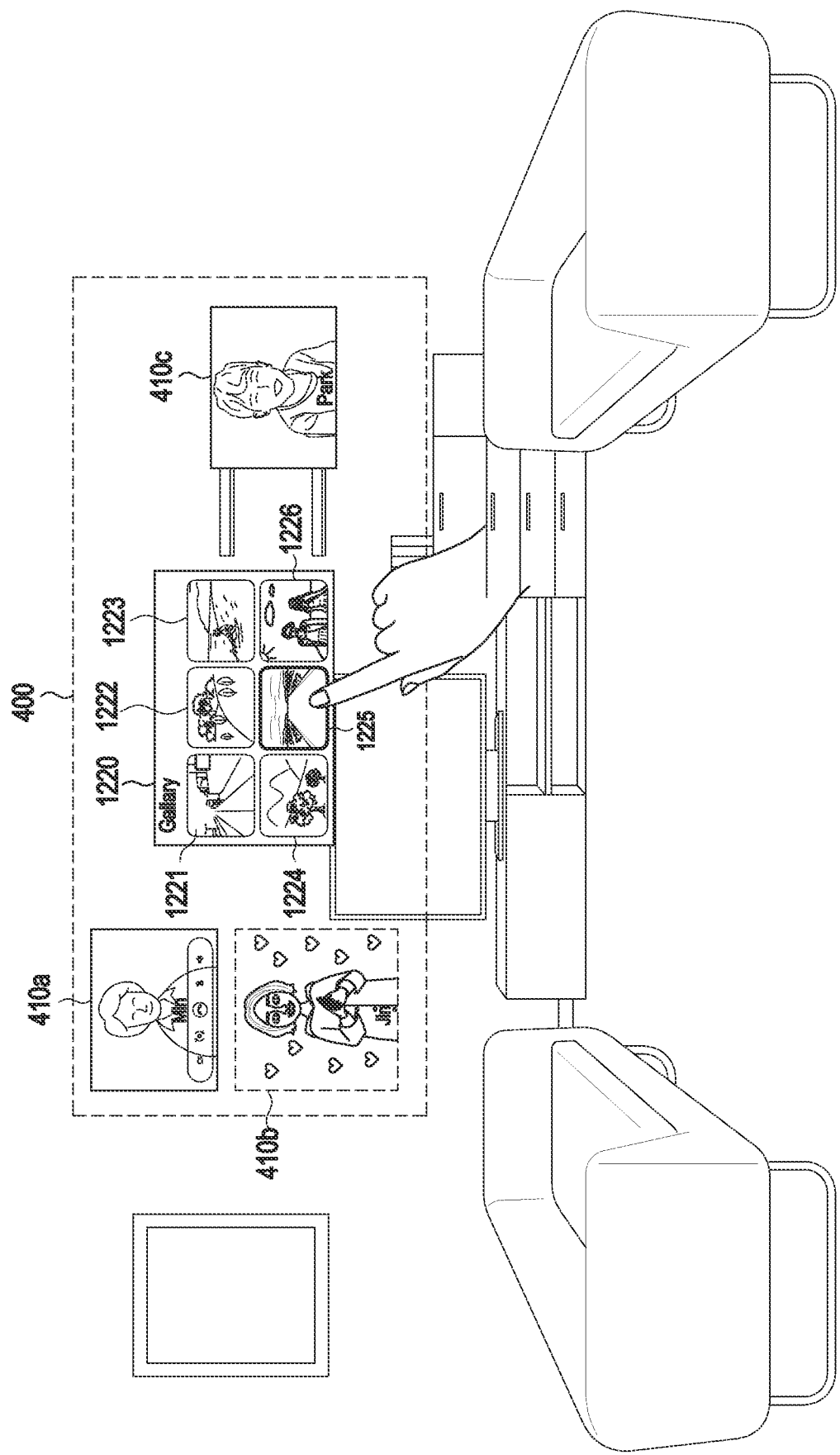
Figure 12C:
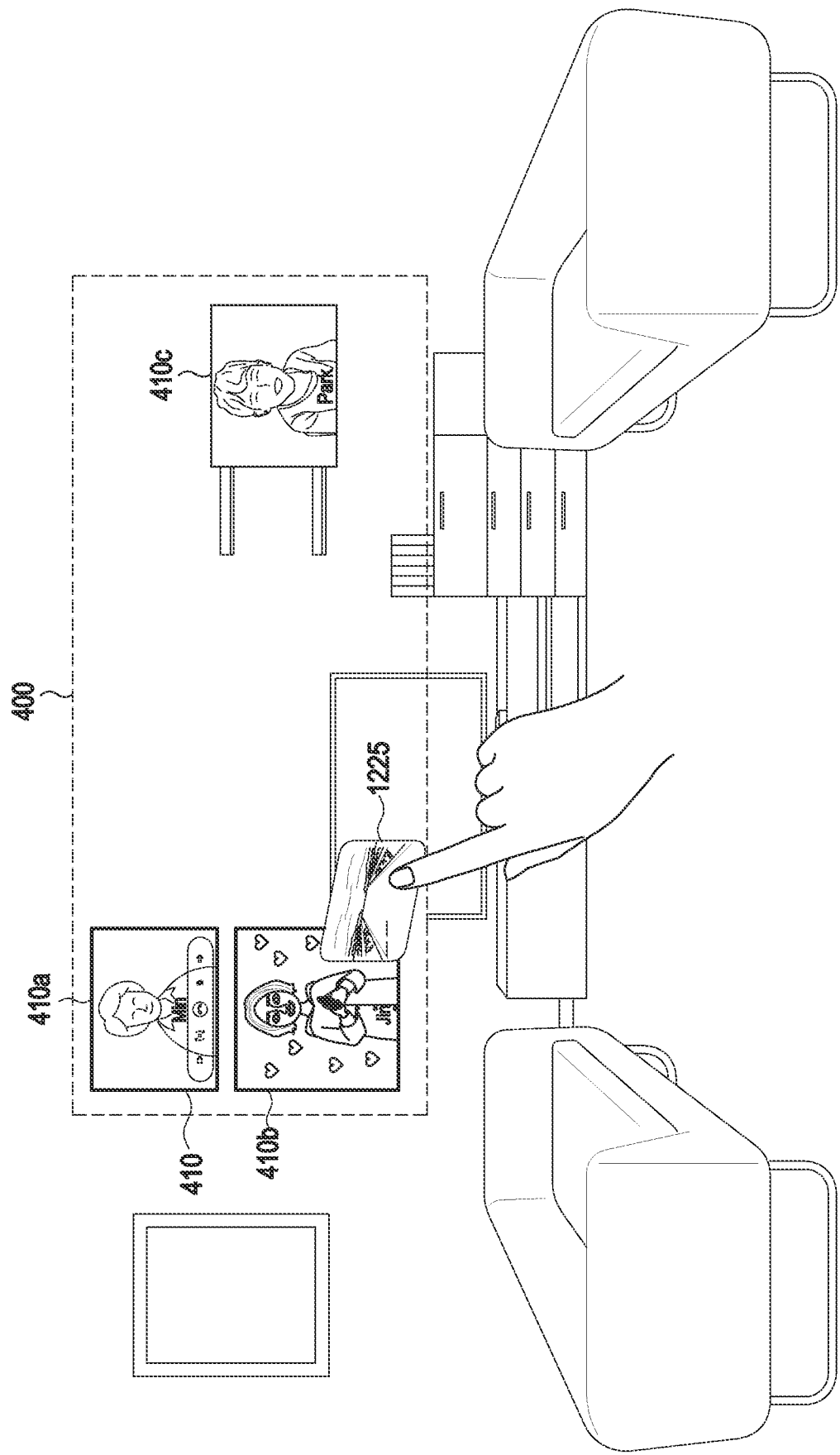

FIGS. 12A, 12B, and 12C are illustrations for describing a function or operation described in FIG. 11 in terms of a graphical user interface according to various embodiments of the disclosure.

Referring to FIG. 11, in operation 1110, the glasses-type wearable device 100 may receive a request for sharing at least one content (e.g., the fifth content 1225). According to an embodiment of the disclosure, the request for sharing the at least one content (e.g., the fifth content 1225) may include a virtual touch input 1210 for one item (e.g., a second item 1214) among, for example, multiple items (e.g., a first item 1212, the second item 1214, and a third item 1216) displayed in the display area 400. When it is determined that an image of a user's body part (e.g., the right hand), acquired by using at least one camera (e.g., the first camera 111), overlap one item (e.g., the second item 1214) among the multiple items (e.g., the first item 1212, the second item 1214, and the third item 1216), or when the movement of a finger selecting the one item (e.g., the second item 1214) in the overlapping state is detected, the glasses-type wearable device may determine that a virtual touch input for the one item (e.g., the second item 1214) has been received. According to another embodiment of the disclosure, whether a virtual touch has been input may be determined by a separate device (e.g., a sensor provided in the user's hand) for determining virtual touches. According to another embodiment of the disclosure, multiple cameras may be used to recognize coordinates in a space in which the user's fingertip is positioned, and whether a virtual touch has been input may be determined based on whether the recognized coordinates in the space match coordinates in a space in which the one item (e.g., the second item 1214) is displayed. In addition, various algorithms (e.g., an artificial intelligence model algorithm) for determining that a virtual touch has been performed may be applied.

In operation 1120, the glasses-type wearable device 100 may receive a selection input (e.g., a virtual touch input) for the at least one content (e.g., the fifth content 1225). When the request for sharing the at least one content (e.g., the fifth content 1225) is received in operation 1110, the glasses-type wearable device 100 may display, in the display area 400, multiple contents to be shared. FIG. 12B illustrates an embodiment in which a gallery application execution screen 1220) including multiple images (e.g., a first content 1221, a second content 1222, a third content 1223, a fourth content 1224, the fifth content 1225, and a sixth content 1226) is displayed in response to the request for sharing the at least one content (e.g., the fifth content 1225). The glasses-type wearable device 100 may receive (e.g., identify) a virtual touch input for one image (e.g., the fifth content 1225) among the multiple images (e.g., the first content 1221, the second content 1222, the third content 1223, the fourth content 1224, the fifth content 1225, and the sixth content 1226). However, the virtual touch input is an embodiment of the selection input, and operation 1120 may be performed by various devices (e.g., a touch panel or a sensor included in the glasses-type wearable device 100).

In operation 1130, the glasses-type wearable device 100 may identify a graphical object corresponding to a group configured for an area (e.g., the first radius area 510) in which the user's body part is positioned. Referring to FIG. 12C, the glasses-type wearable device 100 may detect a gesture (e.g., a virtual drag gesture) for moving the selected content (e.g., the fifth content 1225) to a specific area (e.g., the first radius area 510). In this case, as illustrated in FIG. 12C, the selected content (e.g., the fifth content 1225) may be displayed as a thumbnail image in the display area 400 until the user's gesture ends. FIG. 12C illustrates an embodiment in which the first graphical object 410*a* and the second graphical object 410*b* are determined as graphical objects corresponding to the first area (e.g., the first radius area 510). When it is detected that the user's body part entered the first area (e.g., the first radius area 510), the glasses-type wearable device 100 may display the visual effect 610 around the first graphical object 410*a* and the second graphical object 410*b*.

In operation 1140, the glasses-type wearable device 100 according to an embodiment herein may detect a sharing gesture. In operation 1150, the glasses-type wearable device 100 may transmit, based on the detection of the sharing gesture, at least one content (e.g., the fifth content 1225) to the counterpart device 280 corresponding to the identified graphical object. The sharing gesture may include a virtual drop gesture for dropping the displayed thumbnail image. In order to determine the gesture for dropping the thumbnail image, the glasses-type wearable device 100 may use at least some of the above-mentioned functions or operations of determining the virtual touch input or a template (e.g., a template corresponding to the drop gesture) pre-stored in the glasses-type wearable device 100 to determine whether the user's gesture is a gesture for dropping the thumbnail image. When the sharing gesture is detected, the glasses-type wearable device 100 may transmit data about at least one content (e.g., the fifth content) stored in the glasses-type wearable device 100 to counterpart devices 280 (e.g., the counterpart device 280 corresponding to the first graphical object 410*a* and the counterpart device 280 corresponding to the second graphical object 410*b*).

Figure 13:
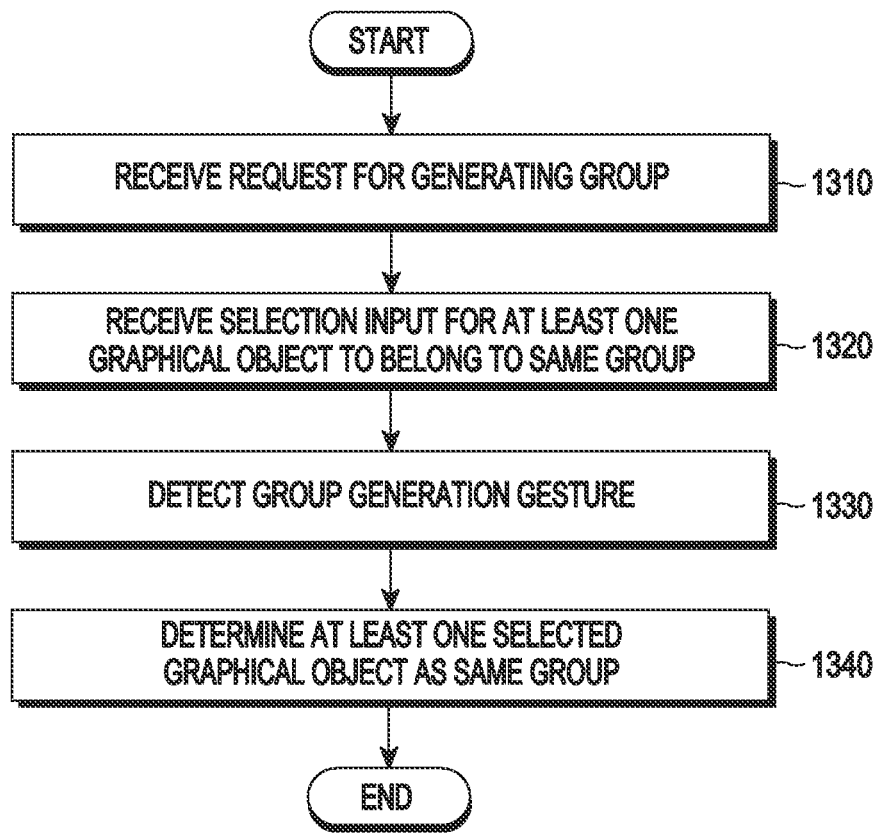
FIG. 13 is an illustration for describing a function or operation in which a glasses-type wearable device herein generates at least one counterpart device into a group corresponding to a specific radius when a group generation gesture is detected according to an embodiment of the disclosure.

FIG. 13 is an illustration for describing a function or operation in which a glasses-type wearable device generates at least one counterpart device into a group corresponding to a specific radius when a group generation gesture is detected according to an embodiment of the disclosure.

FIGS. 14A, 14B, 14C, and 14D are illustrations for describing a function and operation described in FIG. 13 in terms of a graphical user interface according to various embodiments of the disclosure.

Figure 14A:
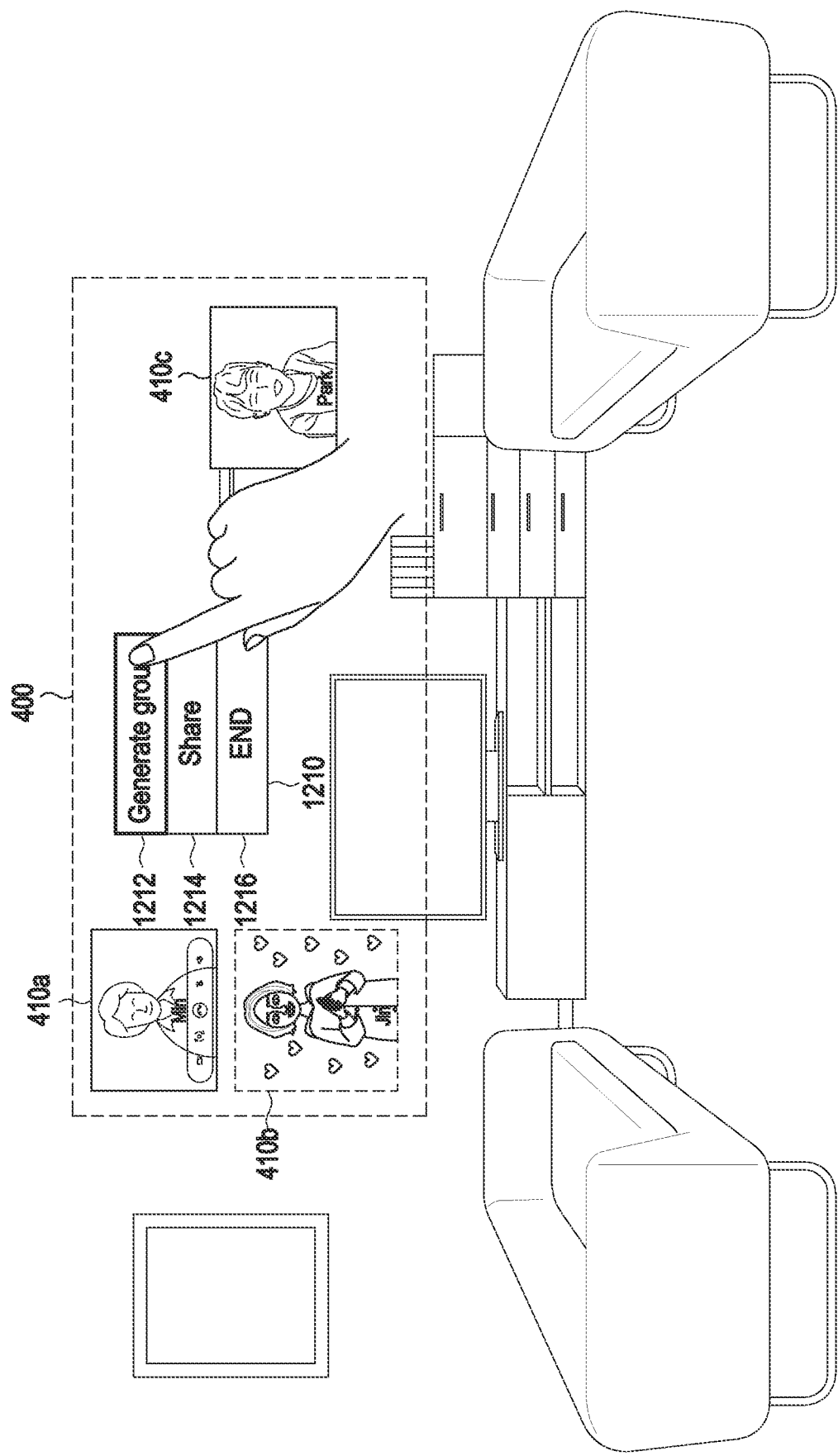
Figure 14B:
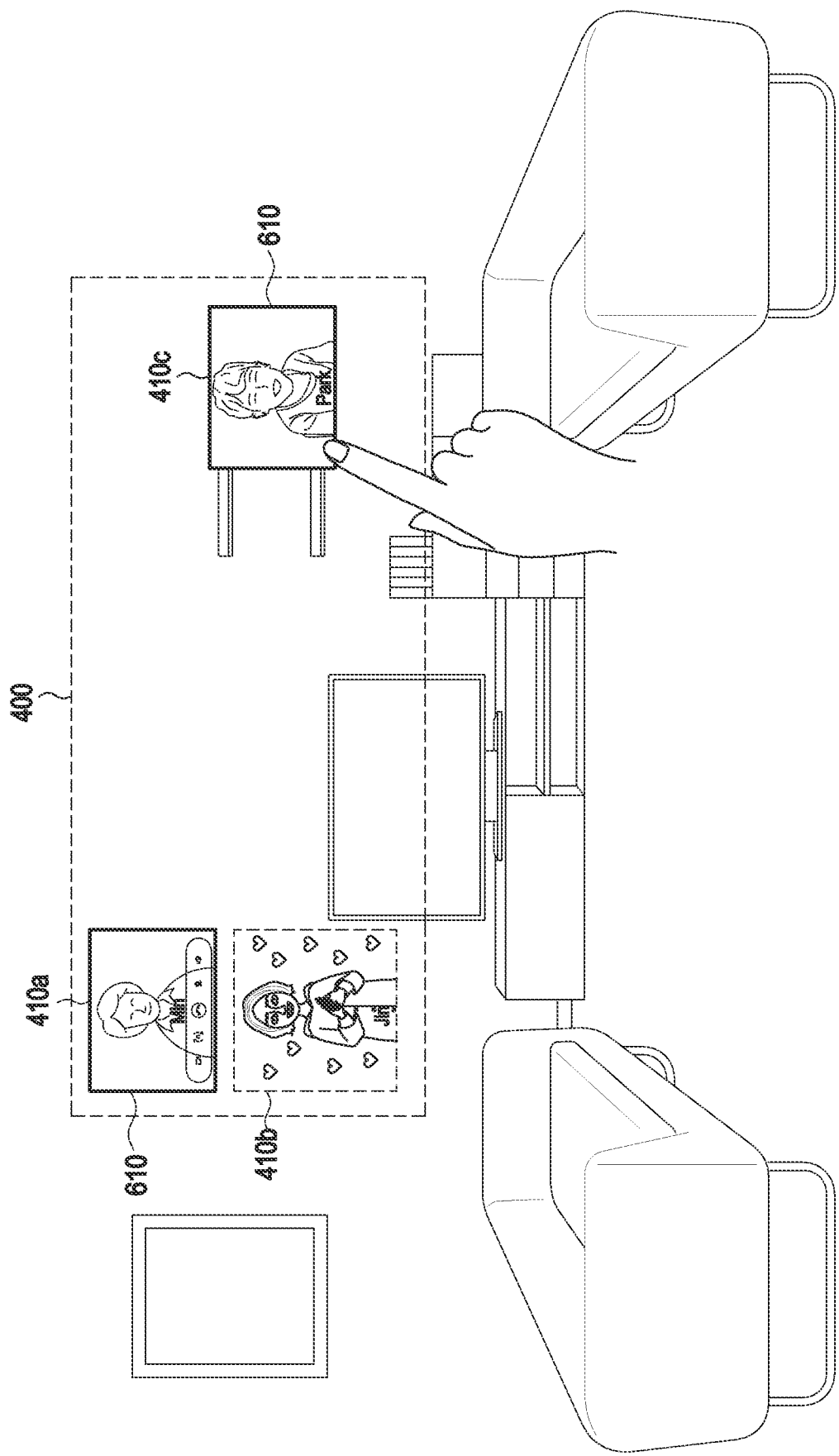

Referring to FIG. 13, in operation 1310, the glasses-type wearable device 100 may receive a request for generating a group. Referring to FIG. 14A, the request for generating the group may include a virtual touch input for one item (e.g., the first item 1212) among multiple items (e.g., the first item 1212, the second item 1214, the third item 1216) displayed in the display area 400.

In operation 1320, the glasses-type wearable device 100 may receive a selection input for at least one graphical object (e.g., the first graphical object 410a and the third graphical object 410c) which is to belong to the same group. According to an embodiment of the disclosure, referring to FIG. 14B, the selection input in operation 1320 may include a virtual touch input for at least one specific graphical object (e.g., the first graphical object 410a and the third graphical object 410c). However, the virtual touch input according to an embodiment of the disclosure may be an embodiment of the selection input, and operation 1320 may be performed by various devices (e.g., a touch panel or a sensor included in the glasses-type wearable device 100).

In operation 1330, the glasses-type wearable device 100 according to an embodiment of the disclosure may detect a group generation gesture (e.g., drag and drop). In operation 1340, the glasses-type wearable device 100 according to an embodiment of the disclosure may determine, based on the group generation gesture, that the at least one selected graphical object (e.g., the first graphical object 410a and the third graphical object 410c) are the same group.

Figure 14D:
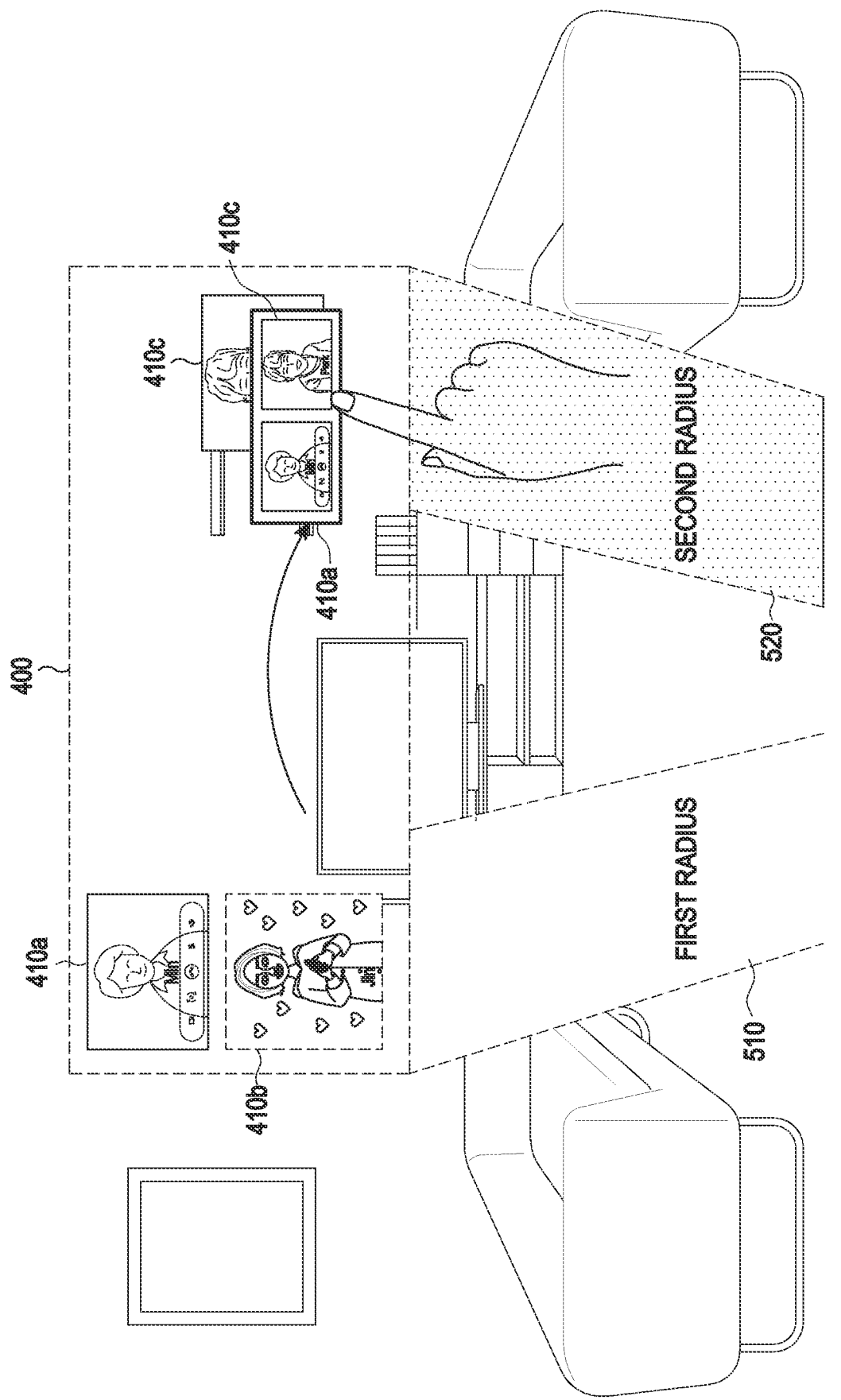

Referring to FIGS. 14C and 14D, the glasses-type wearable device 100 according to an embodiment of the disclosure may detect a gesture for moving a thumbnail image of the at least one selected graphical object (e.g., the first graphical object 410a and the third graphical object 410c) to a first area (e.g., the first radius area 510) or a second area (e.g., the second radius area 520). The glasses-type wearable device 100 according to an embodiment of the disclosure may use an image acquired by at least one camera (e.g., the first camera 111) to identify whether the user's body part (e.g., the user's fingertip) is positioned in the first area (e.g., the first radius area 510) or the second area (e.g., the second radius area 520). When detecting a virtual drop gesture for dropping the thumbnail image corresponding to the at least one selected graphical object (e.g., the first graphical object 410a and the third graphical object 410c) into a specific area (e.g., the first area (e.g., the first radius area 510) or the second area (e.g., the second radius area 520)), the glasses-type wearable device 100 according to an embodiment of the disclosure may generate the at least one selected graphical object (e.g., the first graphical object 410a and the third graphical object 410c) as one group corresponding to the specific area (e.g., the first area (e.g., the first radius area 510) or the second area (e.g., the second radius area 520)).

A wearable device (e.g., the glasses-type wearable device 100) according to an embodiment of the disclosure may include a display module (e.g., the display module 150 in FIG. 1), and at least one processor (e.g., the at least one processor 120 in FIG. 1), wherein the at least one processor is configured to control the display module such that at least one graphical object (e.g., the first graphical object 410a, the second graphical object 410b, or the third graphical object 410c in FIG. 4) is displayed in a display area (e.g., the display area 400 in FIG. 4), identify whether a user's body part is positioned in a first area (e.g., the first radius area 510 and/or the first area 510a), identify a group corresponding to the first area, based on a fact that the user's body part is positioned in the first area, identify whether a trigger event by the user is detected while the user's body part is positioned in the first area, and perform, based on the detection of the trigger event, a function corresponding to the trigger event with respect to at least one counterpart device included in the identified group.

A method for controlling a wearable device (e.g., the glasses-type wearable device 100) according to an embodiment of the disclosure may include controlling a display module of the wearable device such that at least one graphical object (e.g., the first graphical object 410a, the second graphical object 410b, or the third graphical object 410c in FIG. 4) is displayed in a display area, identifying whether a user's body part is positioned in a first area, identifying a group corresponding to the first area, based on a fact that the user's body part is positioned in the first area, identifying whether a trigger event by the user is detected while the user's body part is positioned in the first area, and performing, based on the detection of the trigger event, a function corresponding to the trigger event with respect to at least one counterpart device included in the identified group.

Figure 15:
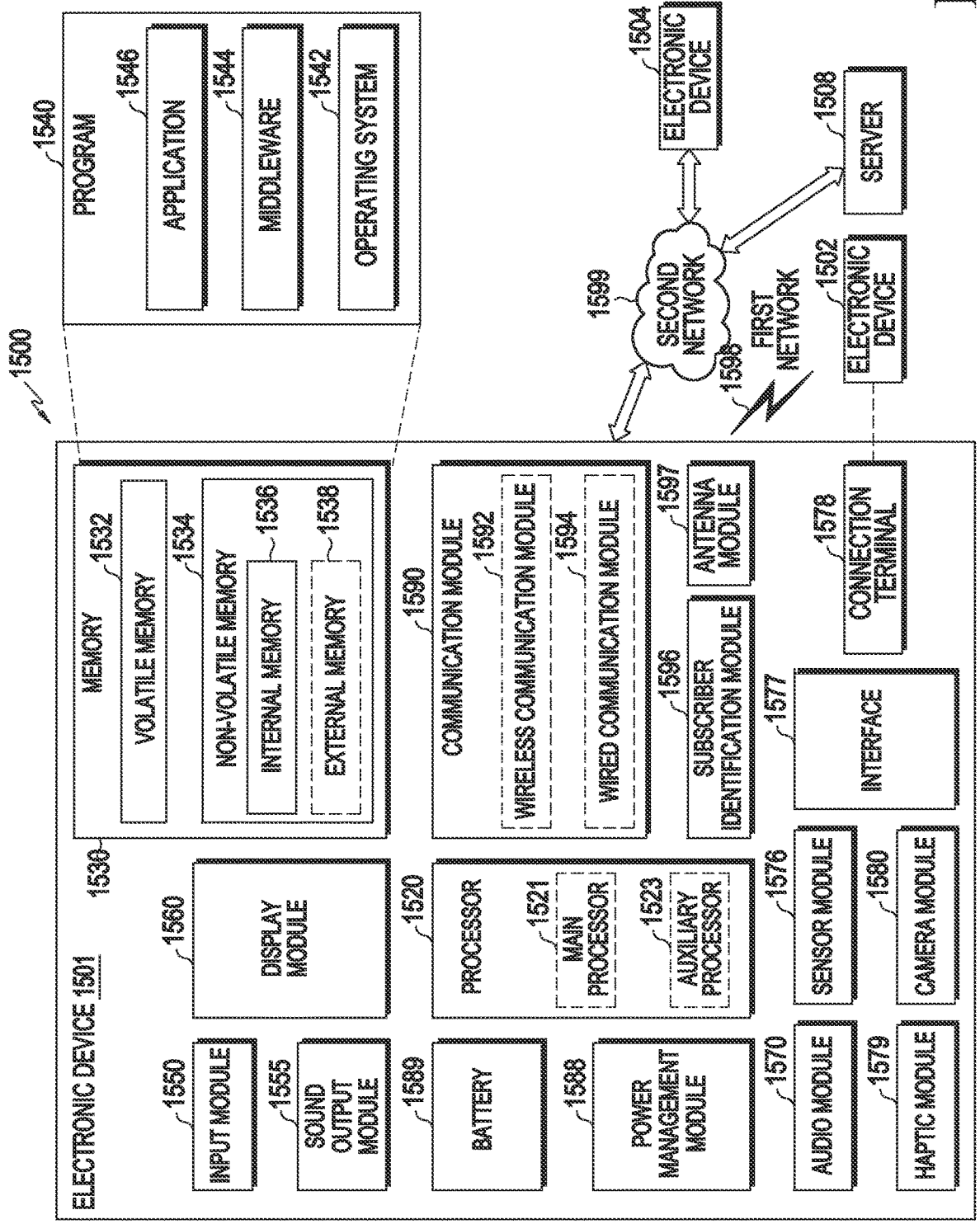
FIG. 15 is a block diagram of an electronic device in a network environment according to an embodiment of the disclosure.

FIG. 15 is a block diagram illustrating an electronic device in a network environment according to an embodiment of the disclosure.

Referring to FIG. 15, an electronic device 1501 in a network environment 1500 may communicate with an external electronic device 1502 via a first network 1598 (e.g., a short-range wireless communication network), or at least one of an external electronic device 1504 or a server 1508 via a second network 1599 (e.g., a long-range wireless communication network). According to an embodiment of the disclosure, the electronic device 1501 may communicate with the external electronic device 1504 via the server 1508. According to an embodiment of the disclosure, the electronic device 1501 may include a processor 1520, a memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments of the disclosure, at least one of the components (e.g., the connecting terminal 1578) may be omitted from the electronic device 1501, or one or more other components may be added in the electronic device 1501. In some embodiments of the disclosure, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment of the disclosure, as at least part of the data processing or computation, the processor 1520 may store a command or data received from another component (e.g., the sensor module 1576 or the communication module 1590) in a volatile memory 1532, process the command or the data stored in the volatile memory 1532, and store resulting data in a non-volatile memory 1534. According to an embodiment of the disclosure, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control, for example, at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active (e.g., executing an application) state. According to an embodiment of the disclosure, the auxiliary processor 1523 (e.g., an image signal processor or a communication processor) may be implemented as part of another component (e.g., the camera module 1580 or the communication module 1590) functionally related to the auxiliary processor 1523. According to an embodiment of the disclosure, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence model is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment of the disclosure, the display module 1560 may include a touch sensor adapted to detect a touch, or a pressure sensor adapted to measure the intensity of force incurred by the touch.

The audio module 1570 may convert a sound into an electrical signal and vice versa. According to an embodiment of the disclosure, the audio module 1570 may obtain the sound via the input module 1550, or output the sound via the sound output module 1555 or an external electronic device (e.g., an external electronic device 1502 (e.g., a speaker or a headphone)) directly or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment of the disclosure, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the external electronic device 1502) directly or wirelessly. According to an embodiment of the disclosure, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the external electronic device 1502). According to an embodiment of the disclosure, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1579 may include, for example, a motor, a piezoelectric element, or an electric stimulator.

The camera module 1580 may capture a still image or moving images. According to an embodiment of the disclosure, the camera module 1580 may include one or more lenses, image sensors, image signal processors, or flashes.

The power management module 1588 may manage power supplied to the electronic device 1501. According to one embodiment of the disclosure, the power management module 1588 may be implemented as at least part of, for example, a power management integrated circuit (PMIC).

The battery 1589 may supply power to at least one component of the electronic device 1501. According to an embodiment of the disclosure, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the external electronic device 1502, the external electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment of the disclosure, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device 1504 via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the millimeter wave (mmWave) band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the external electronic device 1504), or a network system (e.g., the second network 1599). According to an embodiment of the disclosure, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment of the disclosure, the antenna module 1597 may include an antenna including a radiating element including a conductive material or a conductive pattern formed in or on a substrate (e.g., a printed circuit board (PCB)). According to an embodiment of the disclosure, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 from the plurality of antennas. The signal or the power may then be transmitted or received between the communication module 1590 and the external electronic device via the selected at least one antenna. According to an embodiment of the disclosure, another component (e.g., a radio frequency integrated circuit (RFIC)) other than the radiating element may be additionally formed as part of the antenna module 1597.

According to various embodiments of the disclosure, the antenna module 1597 may form a mm Wave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1501 and the external electronic device 1504 via the server 1508 coupled with the second network 1599. Each of the external electronic devices 1502 or 1504 may be a device of a same type as, or a different type, from the electronic device 1501. of the disclosure For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment of the disclosure, the external electronic device 1504 may include an internet-of-things (IoT) device. The server 1508 may be an intelligent server using machine learning and/or a neural network. According to an embodiment of the disclosure, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1540) including one or more instructions that are stored in a storage medium (e.g., an internal memory 1536 or an external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
  a display;
  a communication circuit including a communication circuit;
  memory; and
  at least one processor,
  wherein the memory stores one or more computer programs including computer-executable instructions that, when executed by the at least one processor, cause the wearable device to:
    control the display to display a plurality of graphical objects in a display area, at least two graphical objects from among the plurality of graphical objects corresponding to at least two external devices, respectively,
    identify whether a user's input is positioned in a first area, identify a group of graphical objects corresponding the first area from among the plurality of graphical objects, based on the user's input being positioned in the first area, identify whether a trigger event is detected while the user's input is positioned in the first area, and transmit, based on the detection of the trigger event, a message corresponding to the trigger event to a group of external devices from among the at least two external devices through the communication circuit, each external device from among the group of external devices corresponding to a graphical object from among the group of graphical objects, wherein the first area is an area among a plurality of areas, wherein each area among the plurality of areas is determined based on whether the user's input is detected to be positioned within a range from the wearable device among a plurality of ranges, and wherein a distance from the wearable device to the user's input is determined based on a position of another user's input relative to the wearable device.

2. The wearable device of claim 1, wherein the group of graphical objects is predesignated to correspond to the first area.

3. The wearable device of claim 1, wherein the one or more computer programs further comprise computer-executable instructions to:

provide a predesignated visual effect around the group of graphical objects when the user's input is detected to be positioned in the first area.

4. The wearable device of claim 1, wherein the first area is a predesignated display area in the display area, and wherein the one or more computer programs further comprise computer-executable instructions to:

identify whether the user's input is positioned in the first area by identifying whether the user's input is positioned in the predesignated display area.

5. The wearable device of claim 1, wherein the trigger event includes a gesture by the user's input or a change in a facial expression of the user.

6. The wearable device of claim 1, wherein the trigger event includes a message transmission signal or a call transmission signal received from an external electronic device through the communication circuit.

7. The wearable device of claim 6, wherein the transmitted message comprises a text message or a call transmission function.

8. The wearable device of claim 1, wherein the one or more computer programs further comprise computer-executable instructions to:

receive a request for sharing at least one content stored in the memory with the group of external devices.

9. The wearable device of claim 8, wherein the one or more computer programs further comprise computer-executable instructions to:

transmit, based on reception of a sharing gesture from the user, the at least one content to the group of external devices.

10. The wearable device of claim 1, wherein, to identify the group of graphical objects, the one or more computer programs further comprise computer-executable instructions to:

identify the group of graphical objects based on a group generation gesture from the user.

11. A method, comprising:

controlling a display to display a plurality of graphical objects in a display area, at least two graphical objects from among the plurality of graphical objects corresponding to at least two external devices, respectively;

identifying whether a user's input is positioned in a first area;

identifying a group of graphical objects corresponding to the first area from among the plurality of graphical objects, based on the user's input being positioned in the first area;

identifying whether a trigger event is detected while the user's input is positioned in the first area; and transmitting, based on the detection of the trigger event, a message corresponding to the trigger event to a group of external devices from among the at least two external devices, each external device from among the group of external devices corresponding to the group of graphical objects, wherein the first area is an area among a plurality of areas, wherein each area among the plurality of areas is determined based on whether the user's input is detected to be positioned within a range from a wearable device among a plurality of ranges, and wherein a distance from the wearable device to the user's input is determined based on a position of another user's input relative to the wearable device.

12. The method of claim 11, wherein the group of graphical objects is predesignated to correspond to the first area.

13. The method of claim 11, further comprising:

providing a predesignated visual effect around the group of graphical objects when the user's input is detected to be positioned in the first area.

14. The method of claim 11, wherein the first area is a predesignated display area in the display area, and wherein the method further comprising:

identifying whether the user's input is positioned in the first area by identifying whether the user's input is positioned in the predesignated display area.

15. The method of claim 11, wherein the trigger event includes a gesture by the user's input or a change in a facial expression of the user.

16. The method of claim 11, wherein the trigger event includes a message transmission signal or a call transmission signal received from an external electronic device.

17. The method of claim 16, wherein the transmitted message comprises a text message or a call transmission function.

18. The method of claim 11, wherein the method further comprising:

receiving a request for sharing at least one content stored in a memory with the group of external devices.

19. The method of claim 18, further comprising:

transmitting, based on reception of a sharing gesture from the user, the at least one content to the group of external devices.

20. The method of claim 11, wherein the identifying of the group of graphical objects comprises:

identifying the group of graphical objects based on a group generation gesture from the user.

* * * * *